(12) United States Patent
Shibasaki

(10) Patent No.: US 6,557,018 B1
(45) Date of Patent: Apr. 29, 2003

(54) DESK CALCULATOR CAPABLE OF EASY CHECKING AND TRUSTWORTHY CALCULATION

(76) Inventor: Hiroyuki Shibasaki, 2884, Ooazahachijo, Yashio-shi (JP), 340-0801

(*) Notice: Subject to any disclaimer, the term of this patent is extended or adjusted under 35 U.S.C. 154(b) by 0 days.

(21) Appl. No.: 09/462,529
(22) PCT Filed: May 26, 1998
(86) PCT No.: PCT/JP98/02283
§ 371 (c)(1),
(2), (4) Date: Jan. 7, 2000
(87) PCT Pub. No.: WO99/08199
PCT Pub. Date: Feb. 18, 1999

(30) Foreign Application Priority Data

Aug. 11, 1997 (JP) .............................. 9/227028

(51) Int. Cl.[7] .............................................. G06F 15/04
(52) U.S. Cl. ....................................... 708/131; 708/130
(58) Field of Search ................................ 708/443, 130, 708/131; 707/538, 530; 345/160

(56) References Cited

U.S. PATENT DOCUMENTS 4,580,235 A 4/1986 Yanagawa
5,526,475 A * 6/1996 Razdow ...................... 708/443
5,680,638 A * 10/1997 Satoh .......................... 707/538
5,844,555 A * 12/1998 Menaker et al. ............. 707/530

OTHER PUBLICATIONS

A simulation of an embodiment of this invention using "Excel2000" in a 3.5 inch floppy disk convenient for understanding.

* cited by examiner

Primary Examiner—Chuong Dinh Ngo
Assistant Examiner—Chat Do

(57) ABSTRACT

A electronic calculator in which inputted calculating data consisted of alternately appearing operators and numerical values is maintained very reliable, and with which users can execute very trustworthy sequential works of confirming and restarting calculation very steadily, even after suspending the calculation process at any time in order to confirm or correct inputted calculating items. This calculator is provided with a means of inhibiting reopening of such an input that is not able to maintain consistency that operators and numerical values alternately appear, and a means for resuming the calculation by canceling the inhibition maintaining the consistency that operators and numerical values alternately appear, besides with a memory means for storing each inputted calculating item, and a means for displaying them with the numbers and the total number of them for confirmation, and a means for making them correctable.

9 Claims, 17 Drawing Sheets

FIG. 5

| | OPERATION | DISPLAY PORTION | FLAGS AND OPERATOR REGISTER |
|---|---|---|---|
| (a) | AC | ORDINARY MODE<br>0/0　　　　　0 | F R S A N PREV NEXT<br>0 0 1 0 1　null　null |
| (b) | 5 | ORDINARY MODE<br>1/1　　　　　5 | F R S A N PREV NEXT<br>0 0 0 0 0　null　+ |
| (c) | 4 | ORDINARY MODE<br>1/1　　　　54 | F R S A N PREV NEXT<br>0 0 0 0 0　null　+ |
| (d) | × | ORDINARY MODE<br>1/1　　　54 × | F R S A N PREV NEXT<br>0 0 0 1 1　+　× |
| (e) | 3 | ORDINARY MODE<br>2/2　　　　3 × | F R S A N PREV NEXT<br>0 0 0 0 0　+　× |
| (f) | − | ORDINARY MODE<br>2/2　　　162 − | F R S A N PREV NEXT<br>0 0 0 1 1　×　− |
| (g) | 9 | ORDINARY MODE<br>3/3　　　　9 − | F R S A N PREV NEXT<br>0 0 0 0 0　×　− |
| (h) | = | ORDINARY MODE　RESUME BY OPERATOR KEY<br>3/3　　　　153 = | F R S A N PREV NEXT<br>0 1 0 1 1　−　= |
| (i) | 5 | ORDINARY MODE　RESUME BY OPERATOR KEY<br>3/3　　　　153 =♪ Pip | F R S A N PREV NEXT<br>0 1 0 1 1　−　= |
| (j) | MODE | HISTORY MODE<br>1/3　　+　　54 | F R S A N PREV NEXT<br>1 0 0 1 1　−　= |
| (k) | NEXT | HISTORY MODE<br>2/3　　×　　3 | F R S A N PREV NEXT<br>1 0 0 1 1　−　= |
| (l) | NEXT | HISTORY MODE<br>3/3　　−　　9 | F R S A N PREV NEXT<br>1 0 0 1 1　−　= |
| (m) | NEXT | HISTORY MODE<br>3/3　　−　　9 ♪ Pip | F R S A N PREV NEXT<br>1 0 0 1 1　−　= |
| (n) | BACK | HISTORY MODE<br>2/3　　×　　3 | F R S A N PREV NEXT<br>1 0 0 1 1　−　= |
| (o) | ÷ | HISTORY MODE<br>2/3　　÷　　3 | F R S A N PREV NEXT<br>1 0 0 1 1　−　= |
| (p) | 2 | HISTORY MODE<br>2/3　　÷　　2 | F R S A N PREV NEXT<br>1 0 0 1 0　−　= |
| (q) | REPLACE | HISTORY MODE<br>2/3　　÷　　2  OK  Pip Pip | F R S A N PREV NEXT<br>1 0 0 1 0　−　= |
| (r1) | MODE (ON RECALCULATION) | ORDINARY MODE　ON RECALCULATION<br>1/3　　+　　54 | F R S A N PREV NEXT<br>0 0 0 1 0　−　= |
| (r2) | MODE (AFTER RECALCULATION) | ORDINARY MODE　RESUME BY OPERATOR KEY<br>3/3　　　　18 = | F R S A N PREV NEXT<br>0 1 0 1 1　−　= |

FIG. 6

| | OPERATION | DISPLAY PORTION | FLAGS AND OPERATOR REGISTER |
|---|---|---|---|
| (s) | 2 | ORDINARY MODE  RESUME BY OPERATOR KEY<br>3/3                            18 =♪ Pip | F R S A N  PREV NEXT<br>0 1 0 1 1   —    = |
| (t) | × | ORDINARY MODE<br>3/3                            18 × | F R S A N  PREV NEXT<br>0 0 0 1 1   —    × |
| (u) | 5 | ORDINARY MODE<br>4/4                             5 × | F R S A N  PREV NEXT<br>0 0 0 0 0   —    × |
| (v) | + | ORDINARY MODE<br>4/4                            90 + | F R S A N  PREV NEXT<br>0 0 0 1 1   ×    + |
| (w) | BACK | HISTORY MODE<br>4/4         ×                    5 | F R S A N  PREV NEXT<br>1 0 0 1 1   ×    + |
| (x) | 2 | ORDINARY MODE<br>4/4                             2 + | F R S A N  PREV NEXT<br>0 0 0 1 0   ×    + |
| (y) | MOVE | HISTORY MODE<br>2/4         ÷                    2 | F R S A N  PREV NEXT<br>1 0 0 1 1   ×    + |
| (z1) | INSERT | HISTORY MODE<br>2/5         +                    0 | F R S A N  PREV NEXT<br>1 0 0 1 1   ×    + |
| (z2) | DELETE | HISTORY MODE<br>2/4         ÷                    2 | F R S A N  PREV NEXT<br>1 0 0 1 1   ×    + |
| (b') | − | ORDINARY MODE<br>0/0                             0 − | F R S A N  PREV NEXT<br>0 0 0 1 1   null  — |

DESK CALCULATOR CAPABLE OF EASY CHECKING AND TRUSTWORTHY CALCULATION

BACKGROUND OF THE INVENTION

This invention relates to an electronic calculator capable of easy checking and trustworthy steady calculation, which is provided with a memory means for storing the each inputted calculating item consisted of an operator and a numerical value into an input history storing memory at the ordinary calculator mode, and a means for displaying the stored calculating items for confirmation with the numbers and the total number of the inputted calculating items at the input history display mode, and a means for making displayed calculating items correctable through the substitution, insertion, deletion, etc., and a recalculation means which automatically calls the stored calculating items from the first for recalculation, and, furthermore, a means which, at the ordinary calculation course and after the recalculation, inhibits such an input that is not able to maintain such consistency that operators and numerical values alternately appear, and a means for resuming the calculation by canceling the inhibition, and with which, once calculation is made, the inputted calculating items are confirmable and can be corrected through the minimum number of key operation and the trustworthy results can be easily obtained through automatic recalculation, and, moreover, which can resume the calculation even after suspending the calculation process at any time in order to confirm or correct the inputted data, and enables us trustworthy calculations by making such sequential works of confirming and restarting calculation very easy and steady.

With the prior-art calculators, we must type the same key at least two times in order to find the wrong input.

In addition, if we became anxious for the mistake of our inputted calculating formula, there was no effective way to confirm it at any time on the way during our calculation course and there was no effective way to resume our calculation following next after suspending the calculation task in order to confirm and correct the inputted calculating formula.

SUMMARY OF THE INVENTION

The present invention has been made in order to improve these fundamental problems of the prior-art calculators.

In order to improve these problems, this invention memorizes the each pair of numeric value and operator into an input history storing memory, and enables confirmation by displaying the inputted calculating items by the minimum number of key operation at the history display mode, and enables the correction of these inputted items by through the substitution, insertion, deletion, etc., and enables a recalculation means which automatically calls the stored input calculating items from the first for recalculation, and, with these means, once calculation is made, the inputted data become confirmable and can be corrected through the minimum number of key operation and the trustworthy results can be easily obtained through automatic recalculation.

And, furthermore, this invention enables us very trustworthy steady calculation by allowing us very free sequential works of confirming and resuming calculation, with which we can resume the calculation even after suspending the calculation process at any time at will in order to confirm or correct the inputted data, by being provided with the quick looking back means which displays the input history around the inputted last, or a means which displays the input history around the calculating items where the user suspect as his mistake input just after switching to the input history display mode, and a means for proper resuming of the calculation following next just after the confirmation or the correction like that

BRIEF DESCRIPTION OF THE DRAWINGS

FIG. 5 is a the schematic diagrams that show the key input operations and the corresponding statuses of the liquid crystal display portion and the important flags and the previous operator register and the next operator register of the embodiment.

FIG. 6 is the next page of FIG. 5.

1 is the liquid crystal display portion.
2 is the mode display portion.
3 is the item number display portion.
4 is the total item number display portion.
5 is the numeric value display portion.
6 is the right operator display portion.
7 is the left operator display portion.
8 is the message display portion.
9 is the alarm display portion.
10 is the central processing unit.
11 is the read only memory.
12 is the key input portion.
12a is the mode-switching key (or the recalculation key).
12b is the all-clear key.
12c is the back key 12*d* is the next key.

12*e* is the substitution key.

12*f* is the movement key.

12*g* is the insert key.

12*h* is the delete key.

12*i* is the operator "+" key.

12*j* is the operator "−" key.

12*k* is the operator "×" key.

12*l* is the operator "÷" key.

12*m* is the equal key (the "=" key). (Be careful that in this document the equal key "=" is not included in the operator key.)

12*n* is the numeric key.

13 is the display control circuit 14 is the display unit 15 is the amplifier.

16 is the speaker.

17 is the random access memory.

18 is the numeric value display register.

19 is the item number display register.

20 is the total item number display register.

21 is the right operator display register.

22 is the left operator display register.

23 is the answer register.

24 is the item counter.

25 is the previous operator register.

26 is the next operator register.

F is the mode flag.

R is the numeric key inhibition flag.

S is the initialized status flag.

A is the after operator key flag.

N is the new figure input flag.

27 is the address pointer.

28 is the temporary storage register for the address pointer.

29 is the temporary storage register for the calculating items.

30 is the input history storing memory.

30*a* is the numeric value storing memory.

30*b* is the operator storing memory.

30*a* is the item number storing memory.

DETAILED DESCRIPTION OF THE INVENTION

Now, an embodiment of this invention will be described with reference to the drawings.

Figure 1:
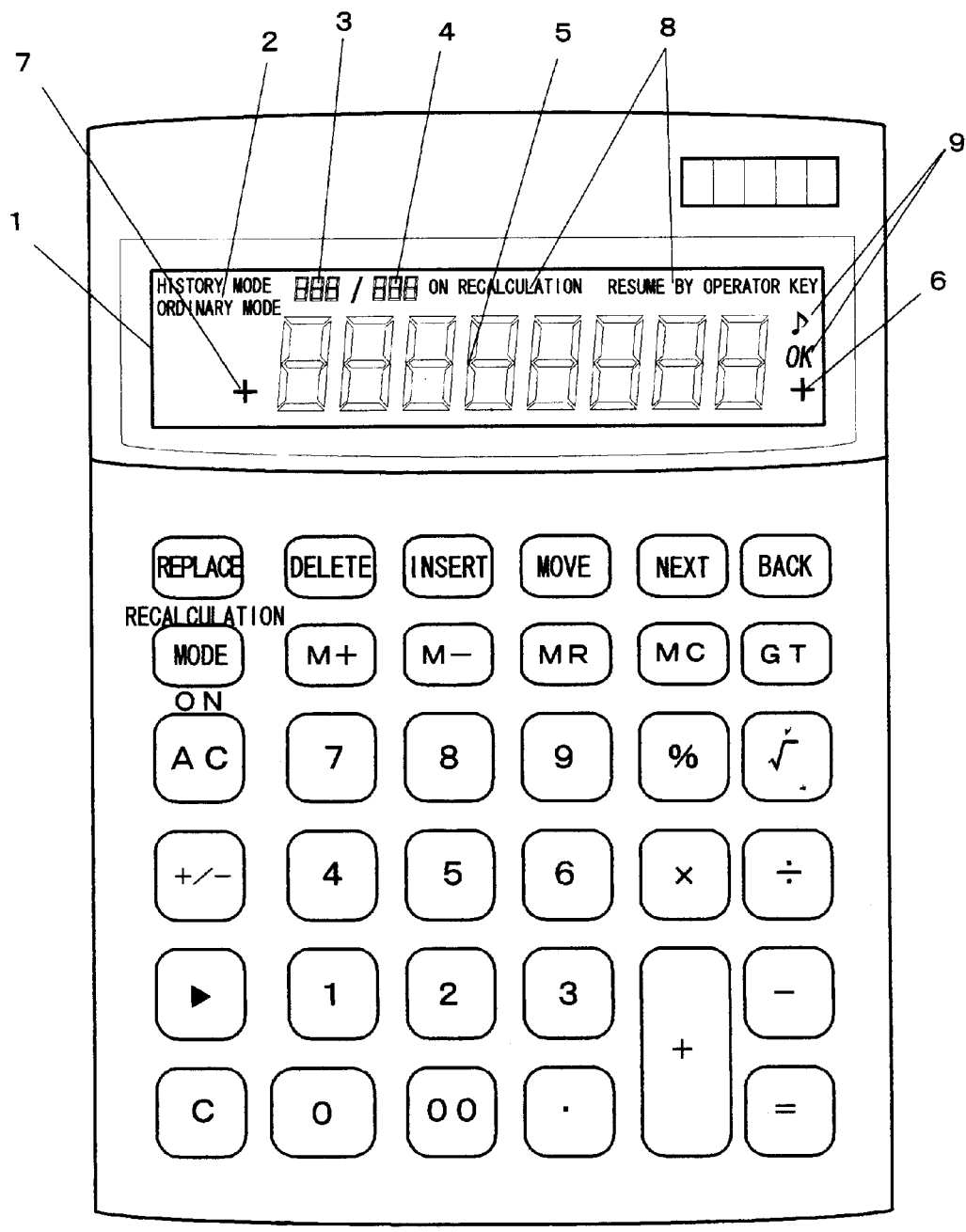
FIG. 1 is an outlook of the embodiment of this invention.

First of all, it would be convenient for understanding to start with the outlook of the embodiment of this invention. FIG. 1 shows an embodiment of this invention. The each button corresponding to the mode switching key (which also works as the recalculation key too in this embodiment), the back key, the next key, the movement key, insert key, delete key, substitution key, tells the rough features of this invention. These keys can be provided with the combination of shift key and the other ordinary key of the prior art calculators, but in this embodiment, these are given the each independent button for understanding from the outlook The detailed actions when these keys (buttons) are depressed are described with the flowcharts later.

Firstly, let's begin with the liquid crystal display portion. The liquid crystal display portion 1 of this embodiment is constituted by the mode display portion 2 and the item number display portion 3 and the total item number display portion 4 and the message display portion 8 and the alarm display potion 9 and the right operator display portion 6 and the left operator display portion 7 and the numeric value display portion 5.

Now, let's look at the each portion briefly.

The Mode Display Portion 2

The mode of this invention is displayed here like "ORDINARY MODE" at the ordinary calculator mode or "HISTORY MODE" at the input history display mode.

The Item Number Display Portion 3

The number of the item currently displaying or inputting is displayed here. This invention memorizes a pair of numeric value and operator as one calculating item at the ordinary calculator mode and displays them with their number at the input history display mode. We can know the relative position of the item by this and the next total number of the inputted item.

The Total Item Number Display Portion 4

The total number of the inputted item is displayed here. We can know the total number of the memorized or inputting items.

The Message Display Portion 8

This invention's important message is displayed here like "ON RECALCULATION" or "RESUME BY OPERATOR KEY". The "ON RECALCULATION " is displayed only during the execution of the recalculation and turned off by the end of the recalculation. The "RESUME BY OPERATOR KEY " is turned on just after the recalculation and just after the "=" key is depressed simultaneously with the numeric key inhibit flag R being turned to 1, and is turned off just after the operator key is depressed or at the switching to the input history display mode simultaneously with the numeric key inhibit flag R being turned to 0. By this display of the "RESUME BY OPERATOR KEY ", the user can be informed that the input of numeric key was disabled and that he can resume his calculation by depressing one of the operator key, "+", "−", "×", "÷".

The Alarm Display Portion 9

This is a display portion that informs visually that the sound alarm was made through amplifier and speaker. This has the "♪" mark display portion which corresponding to the alarm sound "Pip", and the "OK" mark display portion which corresponding to the information sound "Pip, Pip" for informing that the substitution of the numeric value or operator has succeeded.

The Right Operator Display Portion 6

This right operator display portion is used at the ordinary calculator mode. This is located at the right side of the numeric value display portion 5, and is suited very well for displaying the operator that comes just after the numeric value.

The Left Operator Display Portion 7

This left operator display portion is used at the ordinary calculator mode. This is located at the left side of the numeric value display portion 5, and is suited very well for displaying the operator that goes just before the numeric value. In this embodiment, this is located at the definite left position of the numeric value display portion 5, but this can be located at the variable left position by using the just left digit of figure in the numeric value display portion 5.

The Numeric Value Display Portion 5

This works just like the ordinary calculator in order to display the figures, and, at the depression of the movement key, the numeric value displaying here is used as the number of the indicated calculating items.

Secondly, it would be convenient for understanding to describe about the inner structure of the embodiment of this invention.

Figure 2:
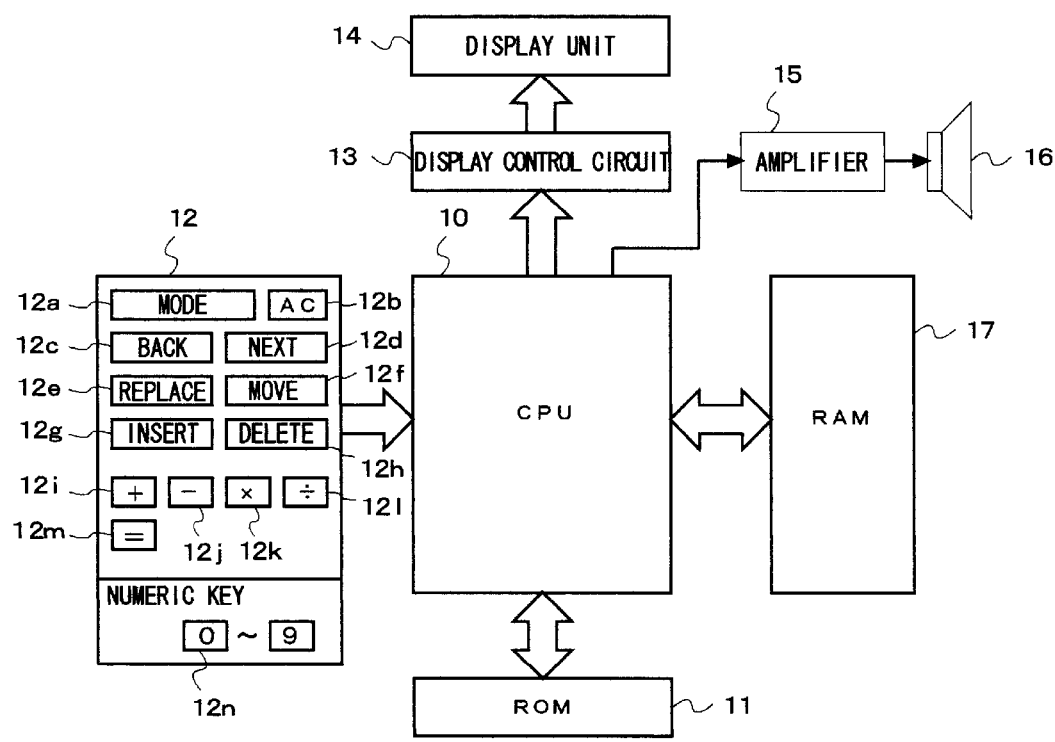
FIG. 2 is a circuit arrangement diagram of the embodiment of this invention.

FIG. 2 is a circuit arrangement diagram of the embodiment of this invention. This invention has the CPU 10 like the ordinary calculator. This CPU 10 loads the system program in the ROM 11, and controls the each circuit by various kinds of computing process according to the signal from the key input portion 12. This CPU 10 is connected with the RAM 17 that is used as various kinds of working area by the system program and with the display unit 14 by the display control circuit 13 and with the speaker 16 through the amplifier 15.

Here, it would be convenient for understanding of the embodiment of this invention to describe about the each flag and each register that is contained in the RAM 17.

Figure 3:
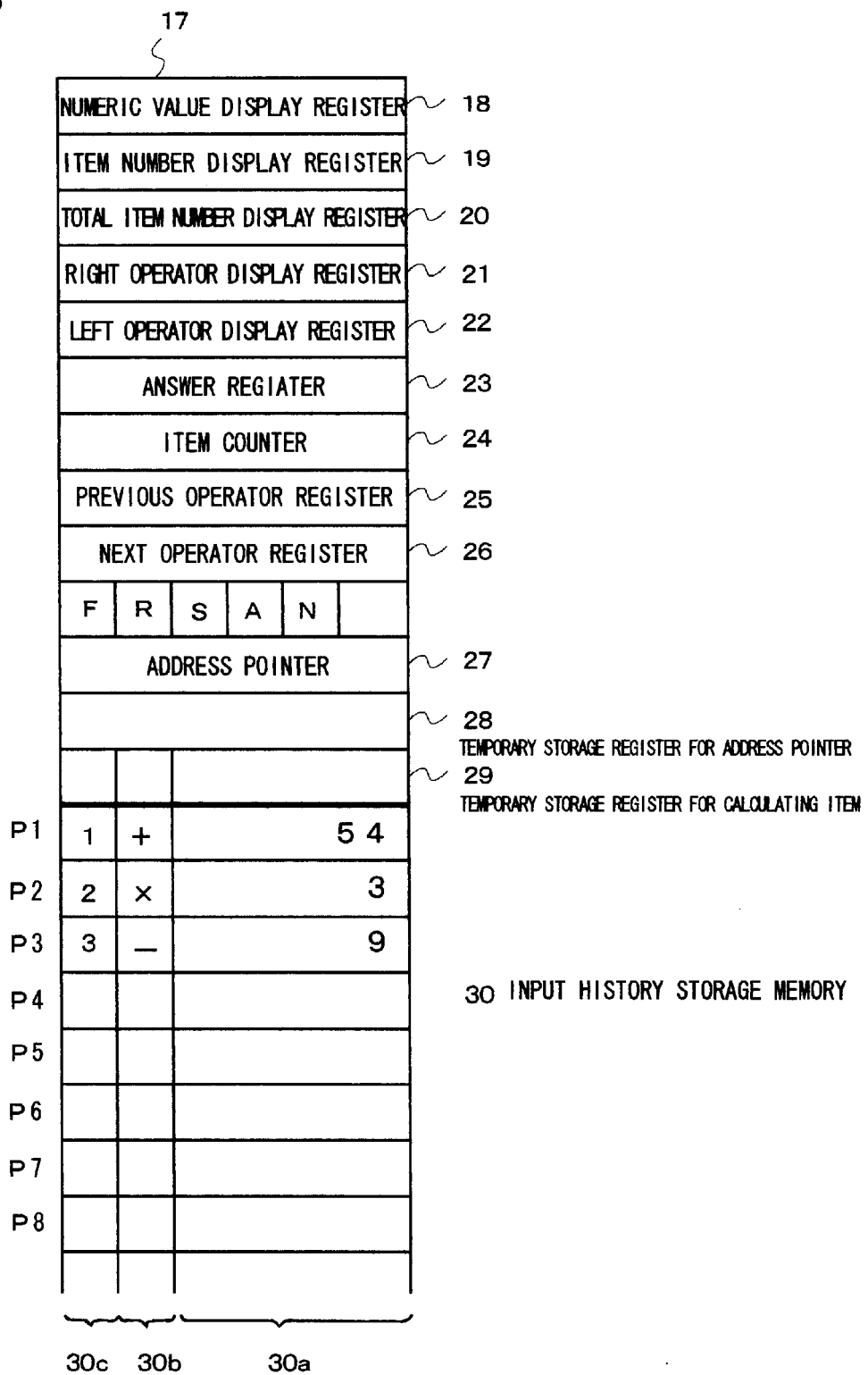
FIG. 3 is a diagram of the RAM of the embodiment of this invention, in case that number of input items is stored.
Figure 4:
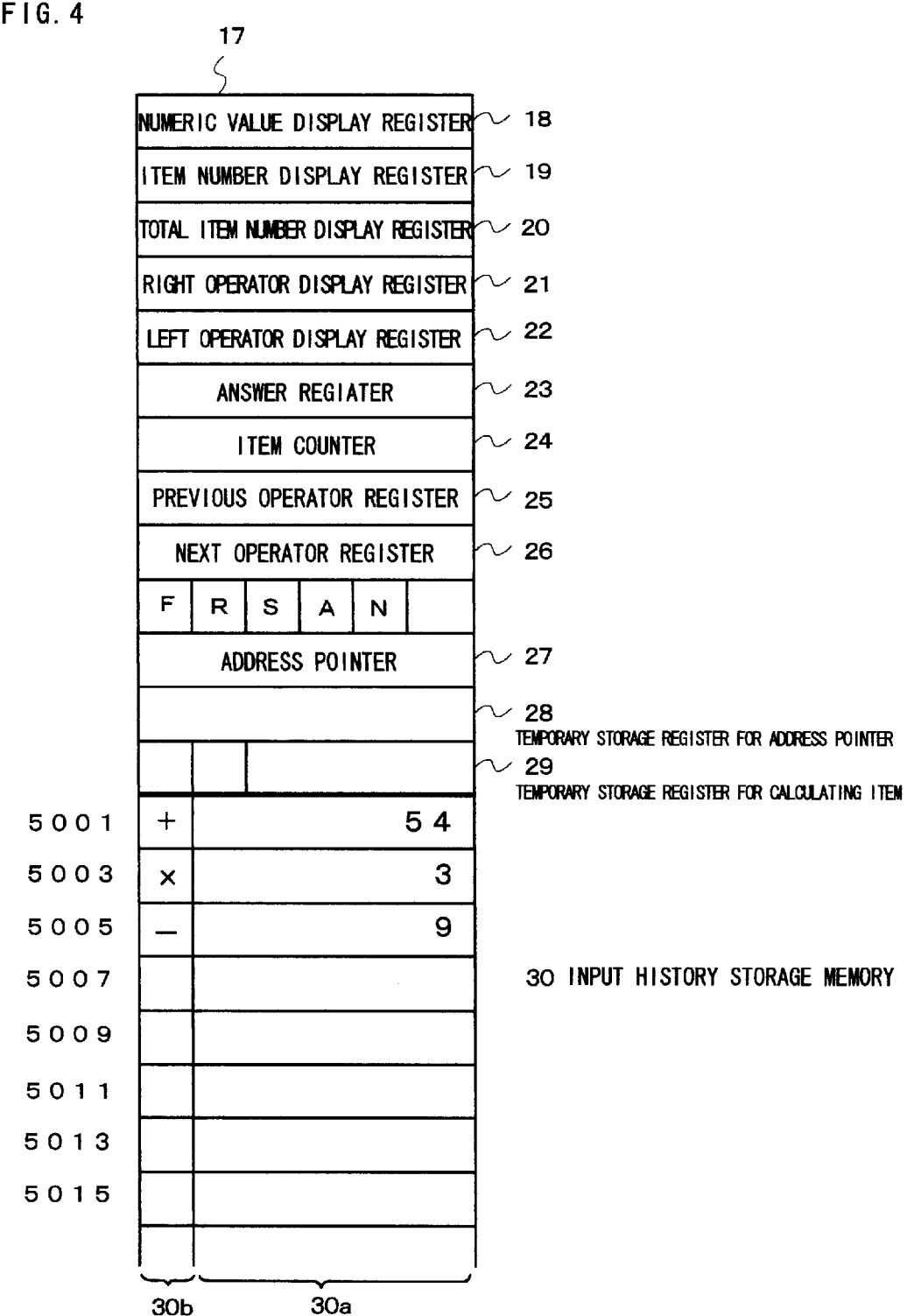
FIG. 4 is a diagram of the RAM of the embodiment of this invention, in case that the number of input items is got from the memory address.

FIG. 3 and FIG. 4 are the diagrams of the flags and registers that are contained in the RAM 17 of the embodiment of this invention. FIG. 3 shows the case that number of the calculating items is stored and FIG. 4 shows the case that the number of calculating items is got from the memory address.

As shown in FIG. 3 and FIG. 4, this embodiment has the display registers like the numeric value display register 18, the item number display register 19, the total item number display register 20, the right operator display register 21, the left operator display register 22, and the flags like the mode flag F, the numeric key inhibition flag R, the initialized status flag. S, the after operator key flag A, the new figure input flag N, and the registers for working like the answer register 23, the item counter 24, the previous operator display register 25, the next operator display register 26, the address pointer 27, the temporary storage register for the address pointer 28, the temporary storage register for the calculating items 29, and as the memory for the storage of calculating formula, the input history storing memory 30.

Here, the roles of these important flags and registers will be described.

The Mode Flag F

This flag works as a flag that switches the two mode of this invention, the ordinary calculator mode and the input history display mode. If this mode flag F is "0" this embodiment works at the ordinary calculator mode and if this F is "1" this embodiment works at the input history display mode.

The Numeric Key Inhibition Flag R

This flag works as a flag that inhibits the input of the numeric key in order to maintain the consistency that operators and numerical values alternately appear. This flag is turned to "1" just after the recalculation and just after the depression of the "=" key and the input of the numeric key is disabled. This flag is turned to "0" just after the operator key other than the "=" key is depressed and the input of the numeric key is enabled. And the operator depressed here is stored as the operator that fastens the already stored calculating formula and the numeric value comes next.

The Initialized Status Flag S

This flag works as a flag that determines this embodiment is at the initialized status or not which comes after the AC key is depressed and after the turning on. This flag is turned to "1" after the AC key is depressed and after the turning on, and when this flag is "1" this embodiment stores the "+" or the depressed operator as a first operator of calculating formula and after that this flag is turned to "0".

The After Operator Key Flag A

This flag works as a flag with which this embodiment know whether it is just after the operator key is depressed or not The role of this flag is same with that of the ordinary calculator. This flag is turned to "1" just after the operator key is depressed, and turned to "0" by the depressing of the numeric key etc.

The New Figure Input Flag N

This flag works as a flag with which this embodiment know whether the depressed numeric value is the head digit of the figure or not. The role of this flag is same with that of the ordinary calculator. This flag is turned to "0" by depressing the numeric key when this flag is "1" and turned to "1" after the depressing of the operator key and after the movement of the currently displaying calculating item in order to enable the input of new figure.

The Numeric Value Display Register 18

The value inputted to this register is displayed at the numeric value display portion 5 by the display control circuit 13. This works like the ordinary calculator. In addition, the value inputted here is used as the number of the indicated calculating items at the depression of the movement key.

The Total Item Number Display Register 20

The value inputted to this register is displayed at the total item number display portion 4 by the display control circuit 13.

The Item Number Display Register 19

The value inputted to this register is displayed at the item number display portion 3 by the display control circuit 13.

The Right Operator Display Register 21

The value inputted to this register is displayed at the right operator display portion 6 by the display control circuit 13. At the ordinary calculator mode, the operator is displayed at the right operator display portion 6 by being inputted to this right operator display register 21.

The Left Operator Display Register 22

The value inputted to this register is displayed at the left operator display portion 7 by the display control circuit 13. At the input history display mode, the operator is displayed at the left operator display portion 7 by being inputted to this left operator display register 22.

The Answer Register 23

When the operator key is depressed each time the result of the calculation is inputted to this answer register 23. And the value inputted to this register is displayed at the numeric value display portion 5 by the display control circuit 13.

The Item Counter 24

This counter counts the number of the calculating items stored into the input history storing memory. The value of this counter is increased by "1" when each pair of the numeric value and operator is stored into the input history storing memory 30 by the depressing of the operator key.

The Previous Operator Register 25

The operator that goes just before the numeric value currently being treated is inputted to this register. Each time when the operator key is depressed the operator in the next operator register 26 is transferred into this previous operator register. And the each arithmetic transaction is executed according to this operator that goes just before the numeric value and has been inputted in this previous operator register. These processes are completely same with the ordinary calculator.

The Next Operator Register 26

The operator that comes just after the numeric value that currently is treated is inputted to this register. Each time when the operator key is depressed the operator in this next operator register is transferred into the previous operator register 25. And the operator that is depressed then is inputted to this next operator register, and is also inputted to the right operator display register 21 and is displayed at the right operator display portion 6 by the display control circuit 13. (Be careful about that the operator displayed at the depression of the operator key is the just the depressed operator key stored in this next operator register, but the arithmetic transaction executed by this depression of the operator key is done according to the operator that goes just before the numeric value and has been inputted in this previous operator register 25. These processes are completely same with the ordinary calculator.)

The Address Pointer 27

This pointer indicates the address position with which the calculating item consists of a pair of the numeric value and operator are stored in and read from the input history storing memory 30.

The Temporary Storage Register for the Address Pointer 28

This register accommodates the value of the said address pointer temporarily at the insertion and the deletion of the calculating items.

The Temporary Storage Register for the Calculating Items 29

This register accommodates the value of a pair of the numeric value and operator temporarily at the insertion and the deletion of the calculating items.

The Input History Storing Memory 30

This is the area where the input history of the calculating items is stored. FIG. 3 shows the case that number of calculating items is stored and FIG. 4 shows the case that the number of calculating items is got from the memory address. This input history storing memory consists of the numeric value storing memory 30a and the operator storing memory 30b and the item number storing memory 30c. And the pair of the numeric value and operator is stored here according to the value of the address pointer 27 that is increased by 1 each time the operator key is depressed at the key input portion 12. In this embodiment the numeric value and the operator going just before it are stored as a pair, but the numeric value and the operator coming just after it can be stored as a pair into this input history storing memory.

From here, the movements of the each key of this embodiment will be described. The each key located in the key input portion 12 works differently between the ordinary calculator mode and the input history display mode. FIGS. 7 to 17 are the flowcharts of the processing flow of the embodiment in case that the each key is depressed. The each flowchart has the decision process that decides "F=0?" at the beginning except the AC key, and the flow to the "Yes" (corresponding with "F=0") after this decision process show the movement at the ordinary calculator mode, and the flow to the "No" (corresponding with "F=1") after this decision process show the movement at the input history display mode.

Now, let's look at the movement of the each key briefly.

The Mode-Switching Key (or the Recalculation Key) 12a

Figure 10:
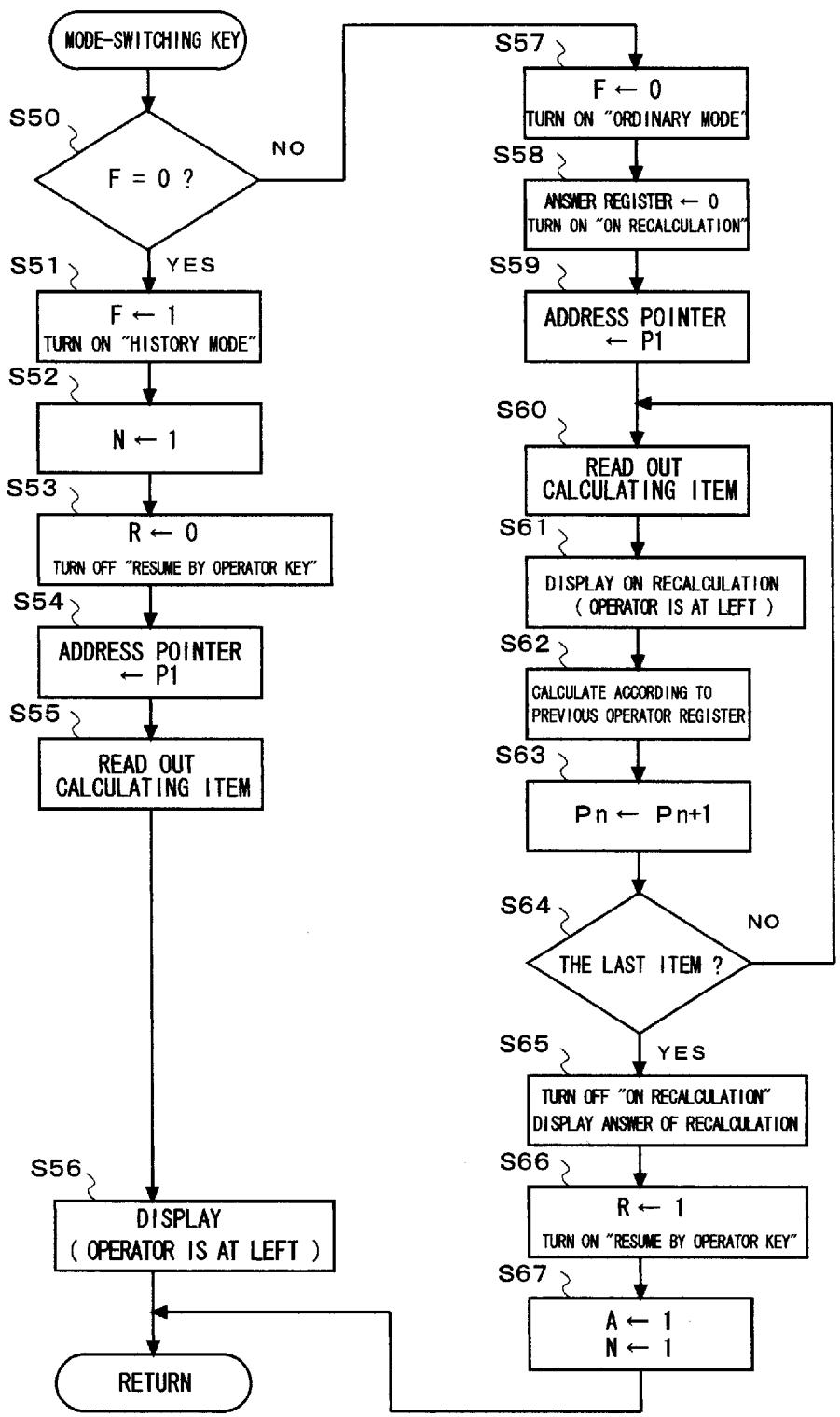
FIG. 10 is the flowchart of the processing flow of the embodiment in case that the mode-switching key (or the recalculation key) is depressed.

FIG. 10 is the flowchart of the processing flow of the embodiment in case that the mode-switching key (or the recalculation key) 12a is depressed.

(The movement of the mode-switching key (or the recalculation key) 12a at the ordinary calculator mode)

This key switches the mode of this embodiment to the input history display mode, and, at the same time, displays the first stored calculating item on the liquid crystal display portion 1.

After the decision that the mode flag F is "0" (step S50) this mode flag F is reversed to "1" and the "HISTORY MODE" is turned on (step S51), and the address P1 of the first calculating item in the input history storing memory 30 is inputted to the address pointer 27 (step S54), and the first calculating item is read out from the input history storing memory 30 indicated by the P1 (step S55), and the operator and the numeric value of the first calculating item is displayed with the number and the total number (step S56). (Here, the operator is displayed at the left operator display portion 7.) During these process the new figure input flag N is turned to "1" in order to enable the input of new figure (step S52), and the numeric key inhibition flag R is turned to "0" and the "RESUME BY OPERATOR KEY" is turned off (step S53).

(The movement of the mode-switching key (or the recalculation key) 12a at the input history display mode)

This key switches the mode of this embodiment to the ordinary calculator mode, and, at the same time, executes the recalculation automatically and displays the answer of it on the liquid crystal display portion.

After the decision that the mode flag F is not "0" (step S50) this mode flag F is turned to "0" and the "ORDINARY MODE" is turned on (step S57), and, at the same time, the answer register 23 is initialized to "0" as a preparation of the recalculation, and the "ON RECALCULATION" is turned on (step S58). Continuously, the address pointer 27 is set "P1" that are the address of the first calculating item stored in the input history storing memory 30 (step S59), and the reading out process from the input history storing memory 30 is executed being indicated by this address pointer 27 (step S60), and the read out calculating item is displayed with the number and the total number of the item (step S61). (Here, the operator is displayed at the left operator display portion 7.) And, the arithmetic transaction is made according to the operator that goes just before the numeric value, and the answer is inputted to the answer register 23 (step S62). And the address pointer 27 is changed to "Pn+1" for preparation of the next reading out process (step S63). And, the decision whether the treated item was the last calculating item or not (step S64) is made, and if it was not the last item the steps S60 to S63 are repeated and the new answer is inputted to the answer register 23 each time. And if it was the last item the "ON RECALCULATION" is turned off and the value of the answer register 23 is transferred to the numeric value display register 18 and the result of the recalculation is displayed (step S65).

Here, Be careful that, if you try to resume your calculation successively just after this recalculation, the operator that connects the already stored calculating formula and the numeric value coming next must be the "=" or the "unsettled meaningless operator" that remains by having been inputted in the past, so our input history storing memory can not maintain the proper consistency that operators and numerical values alternately appear. (You must be careful that the same phenomenon occurs when you depressed the "=" key too at the ordinary calculation mode.)

Therefore, here, the embodiment inhibits the input of the numeric value by turning the numeric key inhibition flag R to "1" and urges the user to input the right operator by turning on the "RESUME BY OPERATOR KEY" (step S66). And after this, the after operator flag A and the new figure input flag N are turned to "1" in order to prepare for resuming the input of numeric value (step S67).

The Next Key 12d

Figure 11:
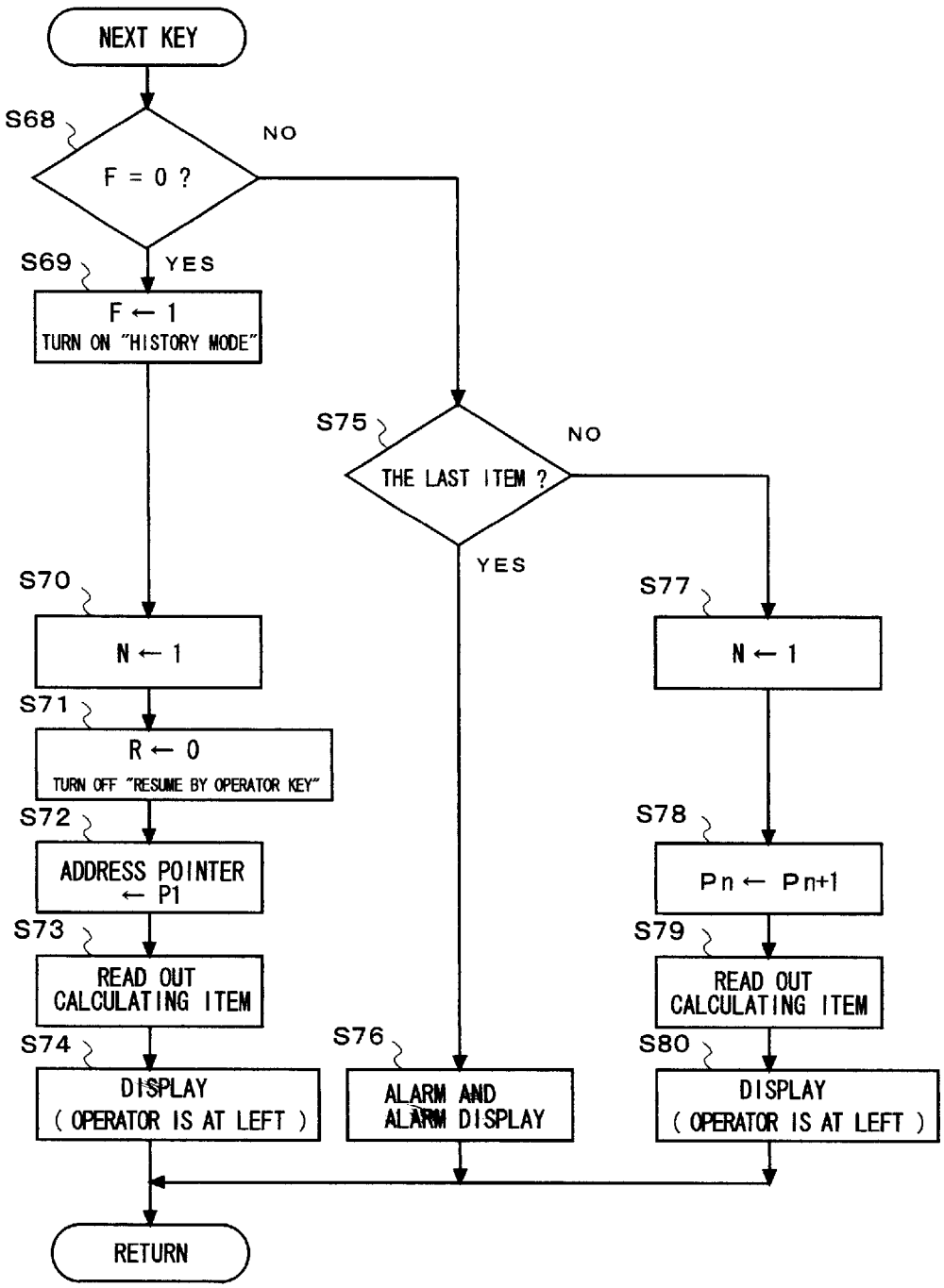
FIG. 11 is the flowchart of the processing flow of the embodiment in case that the next key is depressed.

FIG. 11 is the flowchart of the processing flow of the embodiment in case that the next key 12d is depressed.

(The movement of the next key 12d at the ordinary calculator mode)

This key switches the mode of this embodiment to the input history display mode, and, at the same time, displays the first memorized calculating item on the liquid crystal display portion 1. This movement is completely same with the movement of the mode-switching key 12a at the ordinary calculator mode.

(The movement of the next key 12d at the input history display mode)

This key displays the stored calculating items in the input history storing memory 30 in the order they have been stored. And, if there is no next item, this key informs the user it by the alarm sound "Pip" and the alarm display "♪" at the alarm display portion.

After the decision that the mode flag F is not "0" (step S68), the decision whether the currently displaying item is the last item or not is made (step S75). In case that it was the last item, only the alarm sound "Pip" and the alarm display "♪" at the alarm display portion are made (step S76). In case that it was not the last item, the address pointer is changed to "Pn+1" (step S78), and the input history is read out from the input history storing memory 30 being indicated by the address "Pn+1" (step S79), and the read out calculating item is displayed with the number and the total number of the item (step S80). (Here, the operator is displayed at the left operator display portion 7.) During these process the new figure input flag N is turned to "1" in order to enable the input of new figure (step S77).

The Back Key 12c

Figure 12:
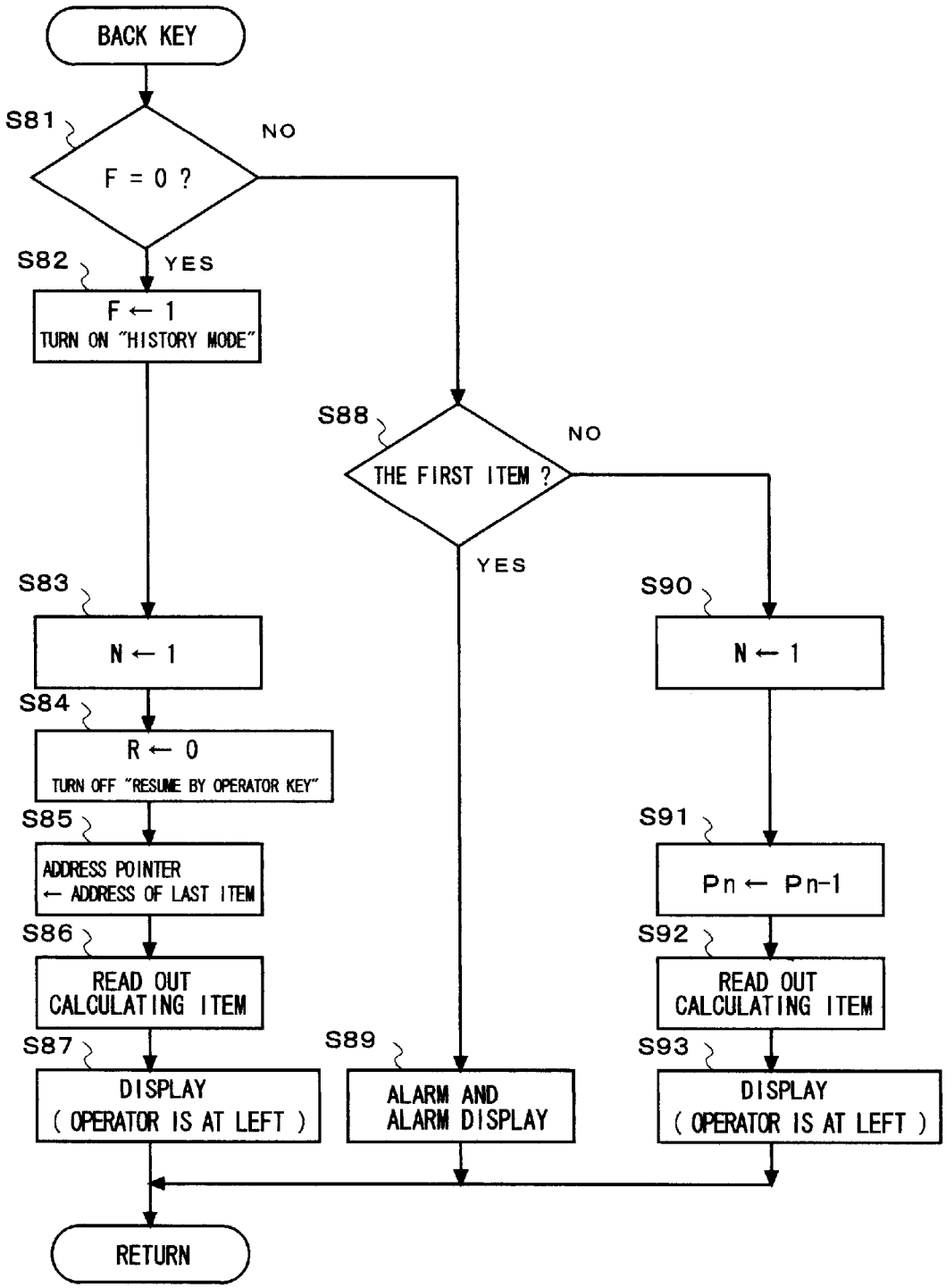
FIG. 12 is the flowchart of the processing flow of the embodiment in case that the back key is depressed.

FIG. 12 is the flowchart of the processing flow of the embodiment in case that the back key 12c is depressed.

(The movement of the back key 12c at the ordinary calculator mode)

This key switches the mode of this embodiment to the input history display mode, and, at the same time, displays the last stored calculating item that has been inputted just before then. This key is a very useful key offering us a quick looking back means that enable us confirming the last inputted calculating items on our calculation works.

This movement is same with the movement of the mode-switching key 12a at the ordinary calculator mode except that the address inputted to the address pointer 27 is the address of the last calculating item not the one of the first (step S85), so the detail will be described at the sample calculation later.

(The movement of the back key 12c at the input history display mode)

This key displays the stored calculating items in the input history storing memory 30 in the reverse order of the order they have been stored. And, if there is no previous item, this key informs the user it by the alarm sound "Pip" and the alarm display "♪" at the alarm display portion.

After the decision that the mode flag F is not "0" (step S81), the decision whether the currently displaying item is the first item or not (step S88). In case that it was the first item, only the alarm sound "Pip" and the alarm display "♪" at the alarm display portion are made (step S89). In case that it was not the first item, the address pointer is changed to "Pn−1" (step S91), and the input history is read out from the input history storing memory 30 being indicated by the address "Pn−1" (step S92), and the read out calculating item is displayed with the number and the total number of the item (step S93). (Here, the operator is displayed at the left operator display portion 7.) During these process the new figure input flag N is turned to "1" in order to enable the input of new figure (step S90).

The Substitution Key 12e

Figure 13:
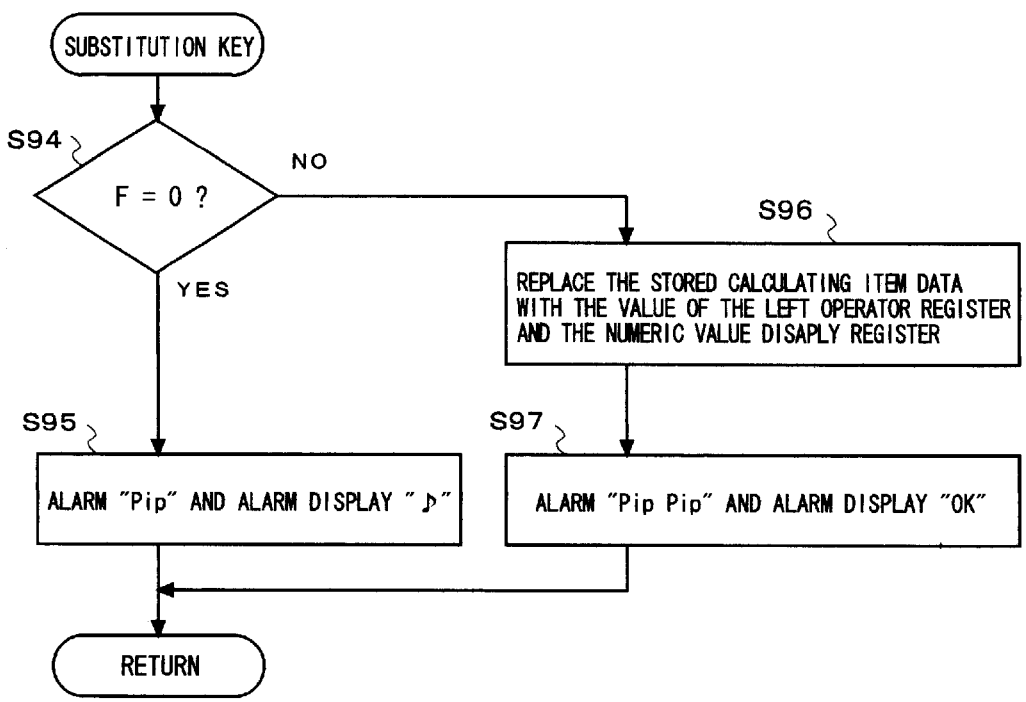
FIG. 13 is the flowchart of the processing flow of the embodiment in case that the substitution key is depressed.

FIG. 13 is the flowchart of the processing flow of the embodiment in case that the substitution key 12e is depressed.

(The movement of the substitution key 12e at the ordinary calculator mode)

After the decision that the mode flag F is "0" (step S94), only the alarm sound "Pip" and the alarm display "♪" at the alarm display portion are made in order to inform the user that the mode is not the input history display mode (step S95).

(The movement of the substitution key 12e at the input history display mode)

After the decision that the mode flag F is not "0" (step S94), the substitution process that replaces the numeric value and the operator in the input history storing memory 30 indicated by the current value of the address pointer 27 with the currently displaying numeric value in the numeric value display register 18 and the currently displaying operator in the left operator display register 22 is executed (step S96). Then the "OK" mark is displayed and the sound "Pip, Pip" is made in order to inform that the substitution of the numeric value and operator has succeeded (step S97).

The Movement Key 12f

Figure 14:
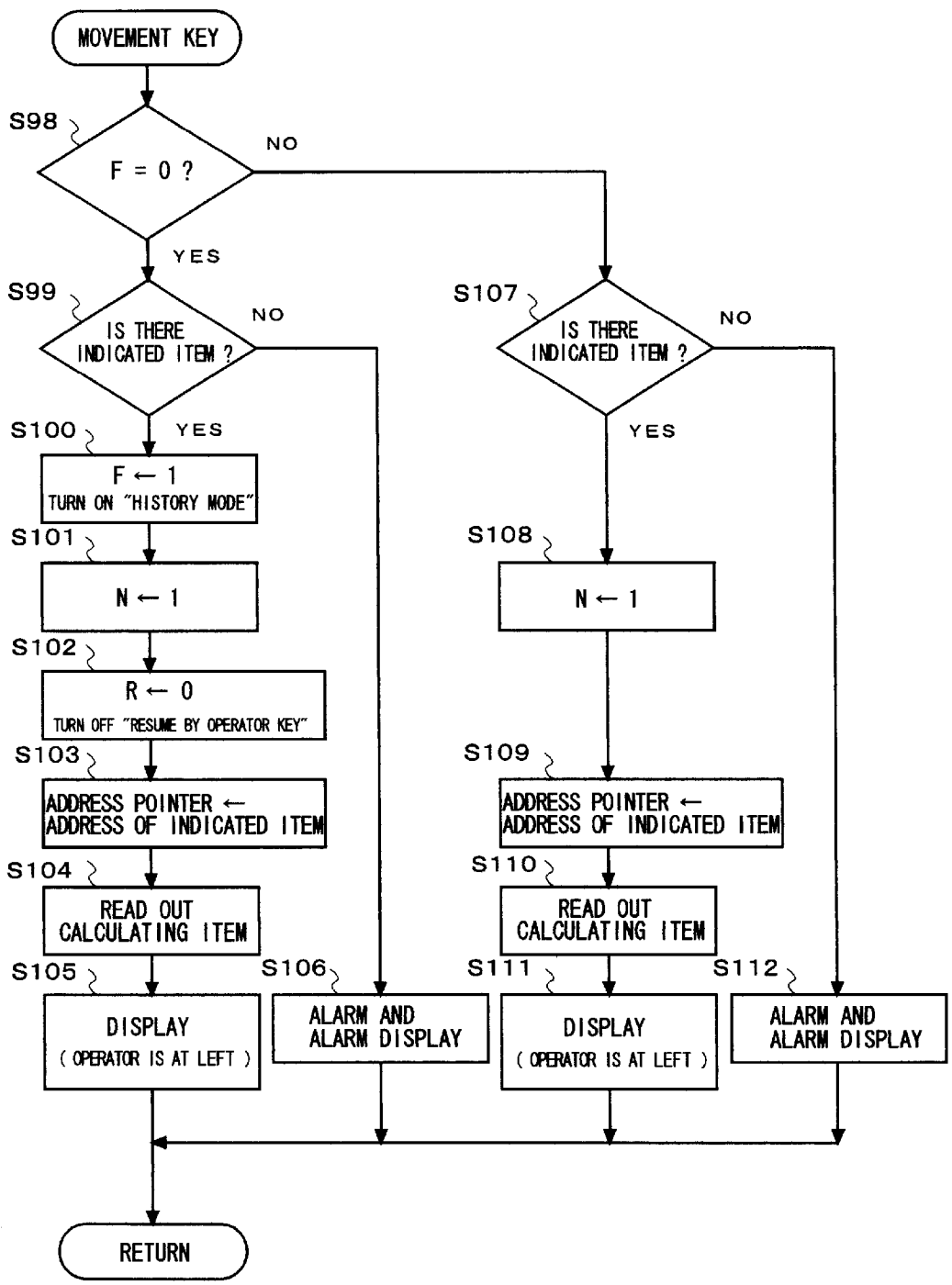
FIG. 14 is the flowchart of the processing flow of the embodiment in case that the movement key is depressed.

FIG. 14 is the flowchart of the processing flow of the embodiment in case that the movement key 12f is depressed.

(The movement of the movement key 12f at the ordinary calculator mode)

This key switches the mode of this embodiment to the input history display mode, and, at the same time, displays the stored calculating item that has the number according to the value of the numeric value display register 18 being displayed at the numeric value display portion 5 when this movement key is depressed.

After the decision that the mode flag F is "0" (step S98), the decision whether the calculating item which has the number indicated by the value of the numeric value display register 18 exists or not is made (step S99). If the indicated calculating item does not exist, only the alarm sound "Pip" and the alarm display "♪" at the alarm display portion are made in order to inform the user it (step S106). If the indicated calculating item exists, this key switches the mode of this embodiment to the input history display mode by turning the mode flag F to "1" and the "HISTORY MODE" is turned on (step S100). And the address of the indicated calculating item is inputted to the address pointer 27 (step S103), then the reading out process of calculating item is executed (step S105), and the calculating item is displayed with the number and the total number of the item (step S105). (Here, the operator is displayed at the left operator display portion 7.) During these process the new figure input flag N is turned to "1" in order to enable the input of new figure and the numeric key inhibition flag R is turned to "0" and the "RESUME BY OPERATOR KEY" is turned off (step S102).

(The movement of the movement key 12f at the input history display mode)

This key displays the stored calculating item that has the number according to the value of the numeric value display register 18 being displayed at the numeric value display portion 5 when this movement key is depressed.

After the decision that the mode flag F is not "0" (step S98), the decision whether the calculating item which has the number indicated by the value of the numeric value display register 18 exists or not is made (step S107). If the indicated calculating item does not exist, only the alarm sound "Pip" and the alarm display "♪" at the alarm display portion are made in order to inform the user it (step S112). If the indicated calculating item exists, the address of the indicated calculating item is inputted to the address pointer 27 (step S109), then the reading out process of calculating item is executed (step S110), and the calculating item is displayed with the number and the total number of the item (step S111). During these process the new figure input flag N is turned to "1" in order to enable the input of new figure (step S108).

The Insert Key 12g

Figure 15:
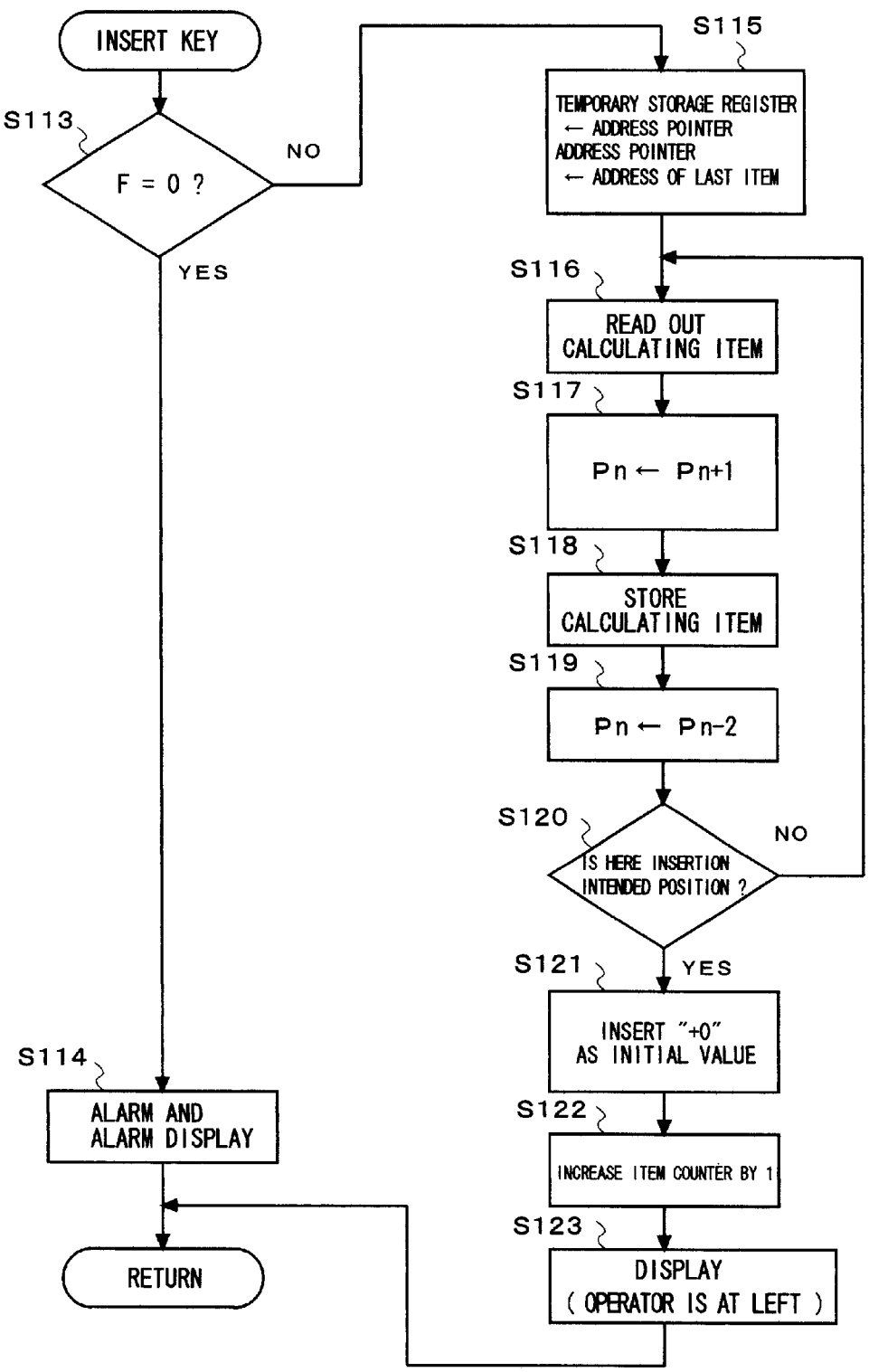
FIG. 15 is the flowchart of the processing flow of the embodiment in case that the insert key is depressed.

FIG. 15 is the flowchart of the processing flow of the embodiment in case that the insert key 12g is depressed.
(The movement of the insert key 12g at the ordinary calculator mode)

After the decision that the mode flag F is "0" (step S113), only the alarm sound "Pip" and the alarm display "♪" at the alarm display portion are made in order to inform the user that the mode is not the input history display mode (step S114).
(The movement of the insert key 12g at the input history display mode)

This key insert the new calculating item that has the initial value of "+0" and displays it with the number and the total number of this new item.

The depression of this insert key 12g when the next item the user want to insert is displayed brings the movement like next After the decision that the mode flag F is not "0" (step S113), the current value of the address pointer 27 is stored into the temporary storage register for the address pointer 28, And the address of the last calculating item is inputted to this address pointer 27 (step S115). Then the reading out process is executed (step S116). Continuously the address pointer 27 that has currently "Pn" as its value is changed to "Pn+1" (step S117), and the calculating item is transferred to the next area indicated by this "Pn+1" (step S118). Continuously the address pointer 27 is changed to "Pn−2" in order to prepare the next migration (step S119). Here, the decision whether the current position is the original position where the insertion was intended or not is made (step S120). These processes (step S116 to S119) are repeated until this migration of calculating item reaches the original position where the insertion was intended. And when it reaches the original position where the insertion was intended, the "+" and "0" are stored as the initial value of the operator and the numeric value (step S121). Lastly, the value of the item counter 24 is increased by "1" (step S122), and the initial value of new calculating item "+0" is displayed with the number and the total number of this new item (step S123). (Here, the operator is displayed at the left operator display portion 7.)

The Delete Key 12h

Figure 16:
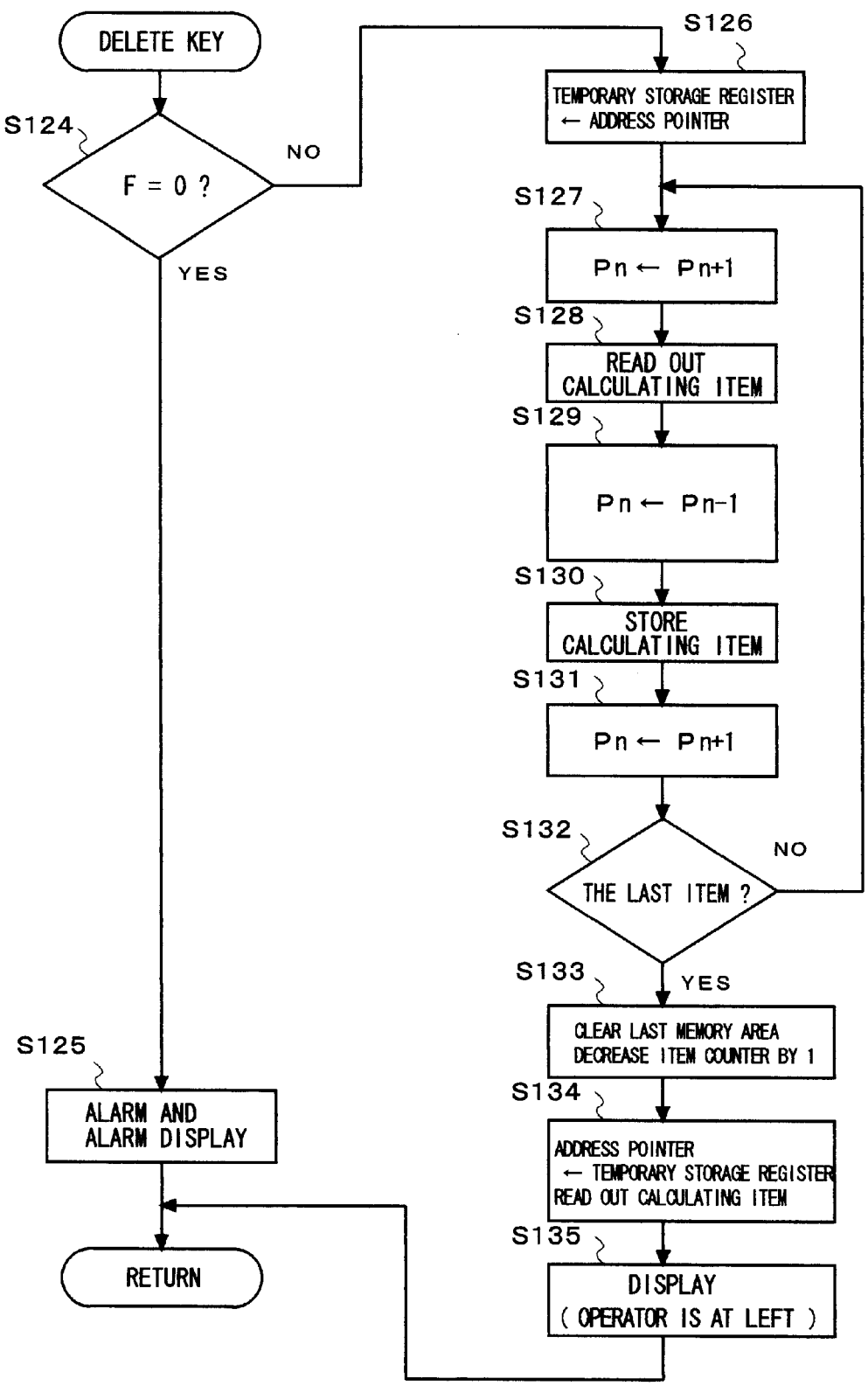
FIG. 16 is the flowchart of the processing flow of the embodiment in case that the delete key is depressed.

FIG. 16 is the flowchart of the processing flow of the embodiment in case that the delete key 12h is depressed.
(The movement of the delete key 12h at the ordinary calculator mode)

After the decision that the mode flag F is "0" (step S124), only the alarm sound "Pip" and the alarm display "♪" at the alarm display portion are made in order to inform the user that the mode is not the input history display mode (step S125).
(The movement of the delete key 12h at the input history display mode)

This key deletes the currently displaying calculating item, and displays the next calculating item by migrating the all stored calculating item one by one in the forward direction.

The depression of this delete key 12h when the item the user want to delete is displayed brings the movement like next. After the decision that the mode flag F is not "0" (step S126), the current value of the address pointer 27 is stored into the temporary storage register for the address pointer 28 (step S126), And the address pointer 27 that has currently "Pn" as it's value is changed to "Pn+1" (step S127), then the reading out process is executed (step S128). Continuously the read out calculating item is migrated to the next area indicated by the address pointer 27 being changed to "Pn−1" (step S130). Then, the address pointer 27 is changed to "Pn+1" in order to prepare the next migration (step S131), and here, the decision whether the current item is the last item or not is made (step S132). If it was not the last item, these processes (step S127 to S131) are repeated until this migration of calculating item reaches the last position. And if it was the last item, the item counter 24 is decreased by "1" and the memory area where the last calculating item has been stored is cleared (step S133). After the value of the temporary storage register for the address pointer 28 is backed to the address pointer 27, the reading out process of the next item of the deleted item is executed (step S134), and the next item is displayed as a new current calculating item with the number and the total number (step S135). (Here, the operator is displayed at the left operator display portion 7.)

The Numeric Key 12n

Figure 7:
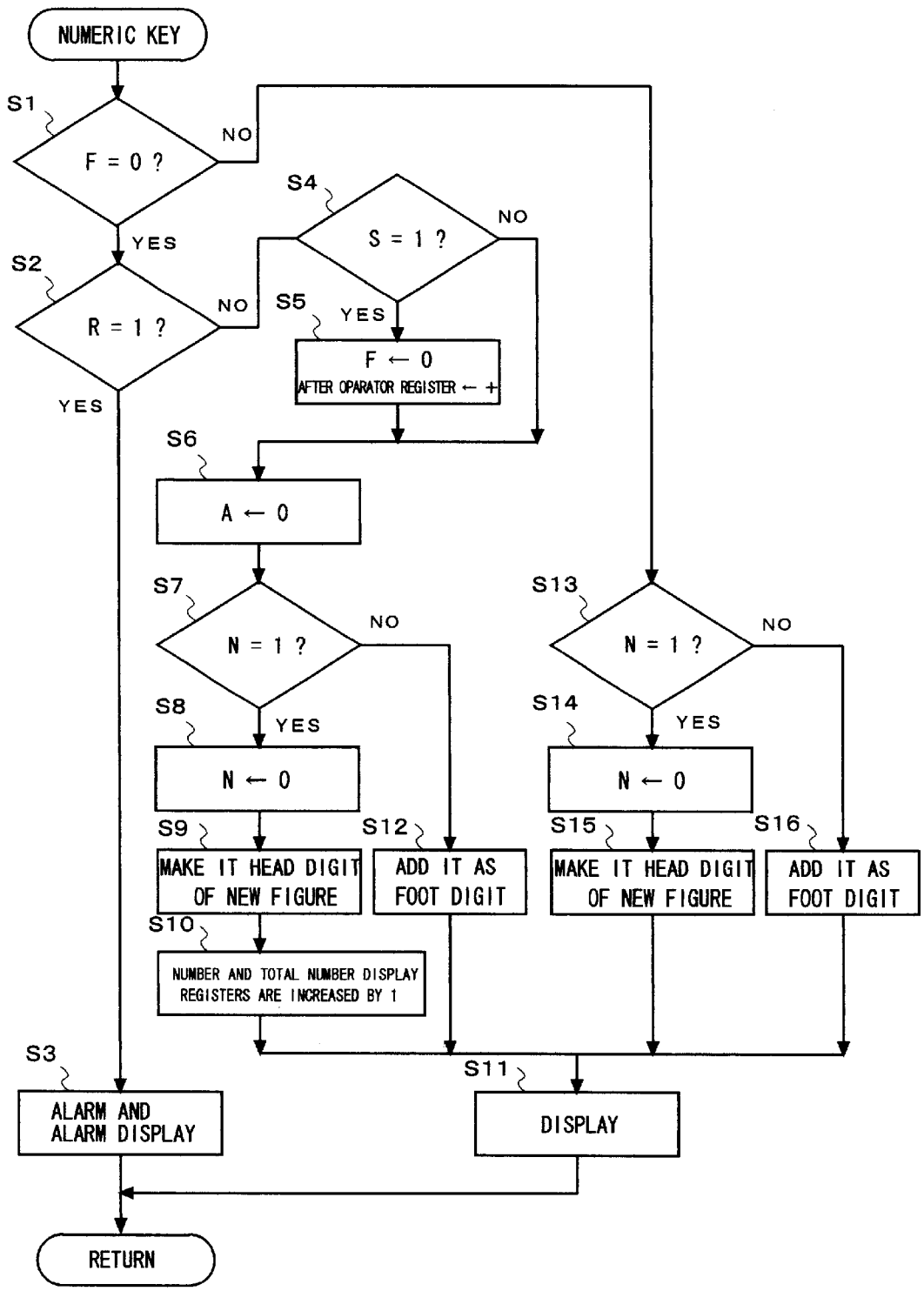
FIG. 7 is the flowchart of the processing flow of the embodiment in case that the numeric key is depressed.

FIG. 7 is the flowchart of the processing flow of the embodiment in case that the numeric key 12n is depressed.
(The movement of the numeric key 12n at the ordinary calculator mode)

Briefly saying, the movement of the numeric key 12n at the ordinary calculator mode is like next.

When the numeric key inhibition flag R is "1", only the alarm sound "Pip" and the alarm display "♪" at the alarm display portion are made.

When the numeric key inhibition flag R is "0", only in case that the initialized status flag S is "1" the first operator of the calculating formula is stored as "+". And after that, if the new figure input flag N is "1" the depressed numeric value is displayed as the head digit of the new figure increasing the displays of the number and the total number by "1" respectively. If the new figure input flag N is "0", the depressed numeric value is added as the foot digit of the currently displaying figure.

The detail is like next.

After the decision that the mode flag F is "0" (step S1), the next decision whether the numeric key inhibition flag R is "1" or not is made (step S2). And if the numeric key inhibition flag R is "1", only the alarm sound "Pip" and the alarm display "♪" at the alarm display portion are made (step S3).

If the numeric key inhibition flag R is not "1", the next decision whether the initialized status flag S is "1" or not is made (step S4). And only in case that the initialized status flag S is "1", the initialized status flag S is reversed to "0" and the next operator register 26 is set "+" as the first operator of the calculating formula (step S5), and the after operator flag A is turned to "0" in order to enable the next arithmetic transaction (step S6). Then the decision whether the new figure input flag N is "1" or not is made (step S7). If this new figure input flag N is "1" the depressed numeric value is the head digit of new figure, so this new figure input flag N is reversed to "0" in order to add the next depressed numeric value as the foot digit of the figure currently displayed (step S8). Then the depressed numeric value is inputted to the numeric value display register 18 as the head digit of the figure (step S9), and the value of the item number display register 19 and total item number display register 20 are increased by "1" (step S10). If this new figure input flag N is not "1" the depressed numeric value is added to the numeric value display register 18 as the foot digit (step S12), and is displayed (step S11).

(The movement of the numeric key 12*n* at the input history display mode)

Briefly saying, the movement of the numeric key 12*n* at the input history display mode is like next.

When the new figure input flag N is "1" the depressed numeric value is displayed as the head digit of the new figure. And when the new figure input flag N is "0", the depressed numeric value is added as the foot digit of the currently displaying figure.

The detail is like next.

After the decision that the mode flag F is "0" (step S1), the next decision whether the decision whether the new figure input flag N is "1" or not is made (step S13). If this new figure input flag N is "1" the depressed numeric value is the head digit of new figure, so this new figure input flag N is reversed to "0" in order to add the next depressed numeric value as the foot digit of the figure currently displayed (step S14). Then the depressed numeric value is inputted to the numeric value display register 18 as the head digit of the figure (step S15). If this new figure input flag N is not "1" the depressed numeric value is added to the numeric value display register 18 as the foot digit (step S16), and is displayed (step S11).

The Operator Key ("+" 12*i*, "−" 12*j*, "×" 12*k*, "÷" 12*l*)

Figure 8:
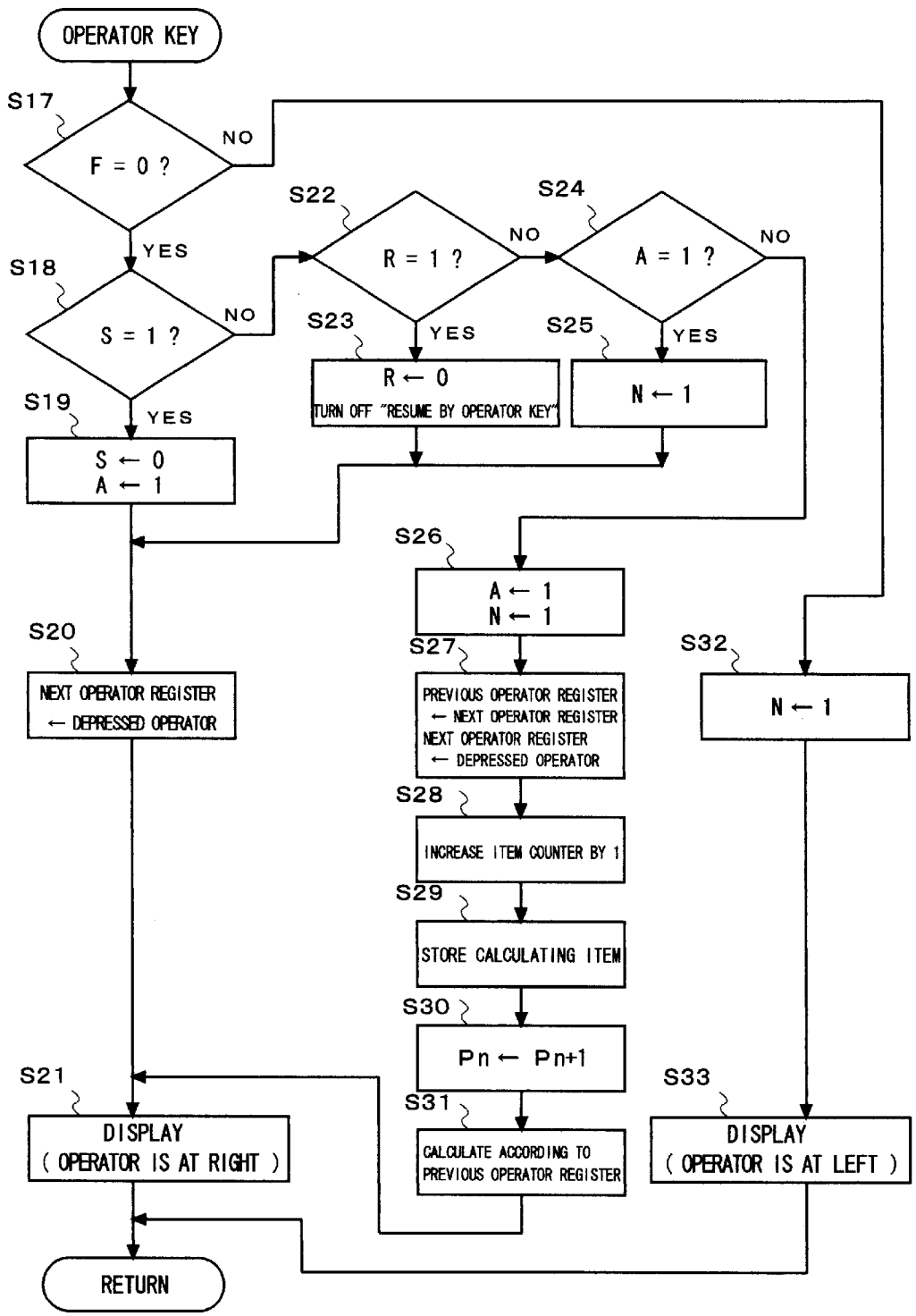
FIG. 8 is the flowchart of the processing flow of the embodiment in case that the operator key "+", "−", "×", "÷" is depressed.

FIG. 8 is the flowchart of the processing flow of the embodiment in case that the operator key "+", "−", "×", "÷" is depressed. (Be careful about that in this document the equal key "=" is not included in the operator key.)

(The movement of the operator key "+", "−", "×", "÷" at the ordinary calculator mode)

Briefly saying, the movement of the operator key "+", "−", "×", "×", "÷" at the ordinary calculator mode is like next.

When the initialized status flag S and the numeric key inhibition flag R and the after operator key A are all not "1", this embodiment executes the same arithmetic transaction and displays the result like the ordinary calculator, and, at the same time, stores the calculating item into the input history storing memory 30 as a pair of the operator and the numeric value.

When the initialized status flag S is "1", the depressed operator of the "+", "−", "×", "÷" is inputted to the next operator register 26 in order to make this operator the first operator that should be placed and stored just before the first numeric value of the calculating formula.

When numeric key inhibition flag R is "1", the depressed operator of the "+", "−", "×", "÷" is inputted to the next operator register 26 in order to make this operator the operator that should connect properly between the already stored calculating formula and the numeric value that comes next after the suspending the calculation.

When the after operator key A is "1", the depressed operator of the "+", "−", "×", "÷" is inputted to the next operator register 26 in order to make this operator the operator that should be replaced with the operator that was depressed by mistake just before.

The detail is like next.

After the decision that the mode flag F is "0" (step S17), the next decision whether the initialized status flag S is "1" or not is made (step S18). When the initialized status flag S is "1", this initialized status flag S is reversed to "0" and the after operator flag A is turned to "1" (step S19). And the depressed operator of the "+", "−", "×", "÷" is inputted to the next operator register 26 in order to make this operator the first operator that should be placed and stored just before the first numeric value of the calculating formula (step S20), and is displayed at the right operator display portion 6 (step S21).

When the initialized status flag S is not "1", the next decision whether the numeric key inhibition flag R is "1" or not is made (step S22). When the numeric key inhibition flag R is "1", this numeric key inhibition flag R is reversed to "0" and the "RESUME BY OPERATOR KEY" is turned off (step S23). And the depressed operator of the "+", "−", "×", "÷" is inputted to the next operator register 26 in order to make this operator the operator that should connect properly between the already stored calculating formula and the numeric value that comes next after the suspending the calculation (step S20), and is displayed at the right operator display portion 6 (step S21).

When the initialized status flag S is not "1" (step S18) and the numeric key inhibition flag R is not "1" (step S22), the next decision that the after operator key A is "1" or not is made (step S24). When the after operator key A is "1", the new figure input flag N is turned to "1" (step S25) and the depressed operator of the "+", "−", "×", "÷" is inputted to the next operator register 26 in order to make this operator the operator that should be replaced with the operator that was depressed by mistake just before step S20), and is displayed at the right operator display portion 6 (step S21).

When the initialized status flag S is not "1" (step S18) and the numeric key inhibition flag R is not "1" (step S22) and the after operator key A is not "1" (step S24), the after operator flag A is reversed to "1" and the new figure input flag N is turned to "1" (step S26). Then the value of the next operator register 26 is transferred to the previous operator register 25 and the depressed operator key is inputted to the next operator register 26 (step S27). Then, after the item counter 24 is increased by "1" (step S28), the input history storing process is executed and the calculating item is stored into the input history storing memory 30 according to the address pointer 27 (step S29). Then, after the value of address pointer "Pn" is changed to "Pn+1" (step S30), the arithmetic transaction is made according to the value of the previous operator register like the ordinary calculator (step S31). Then the result is inputted to both the answer register 23 and the numeric value display register 18 and the value of the item counter 24 is inputted to both the item number display register 19 and the total item number display register 20 and these are displayed at the liquid crystal display portion 1 with the depressed operator displayed at the right operator display portion 6 (step S21).

(The movement of the operator key "+", "−", "×", "÷" at the input history display mode)

After the new figure input flag N is turned to "1" (step S32), the depressed operator of the "+", "−", "×", "÷" is displayed at the left operator display portion 7 as the operator that should be replaced with the operator stored by input mistake before and having been displayed at this input history display mode (step S33).

The Equal ("=") Key 12*m*

Figure 9:
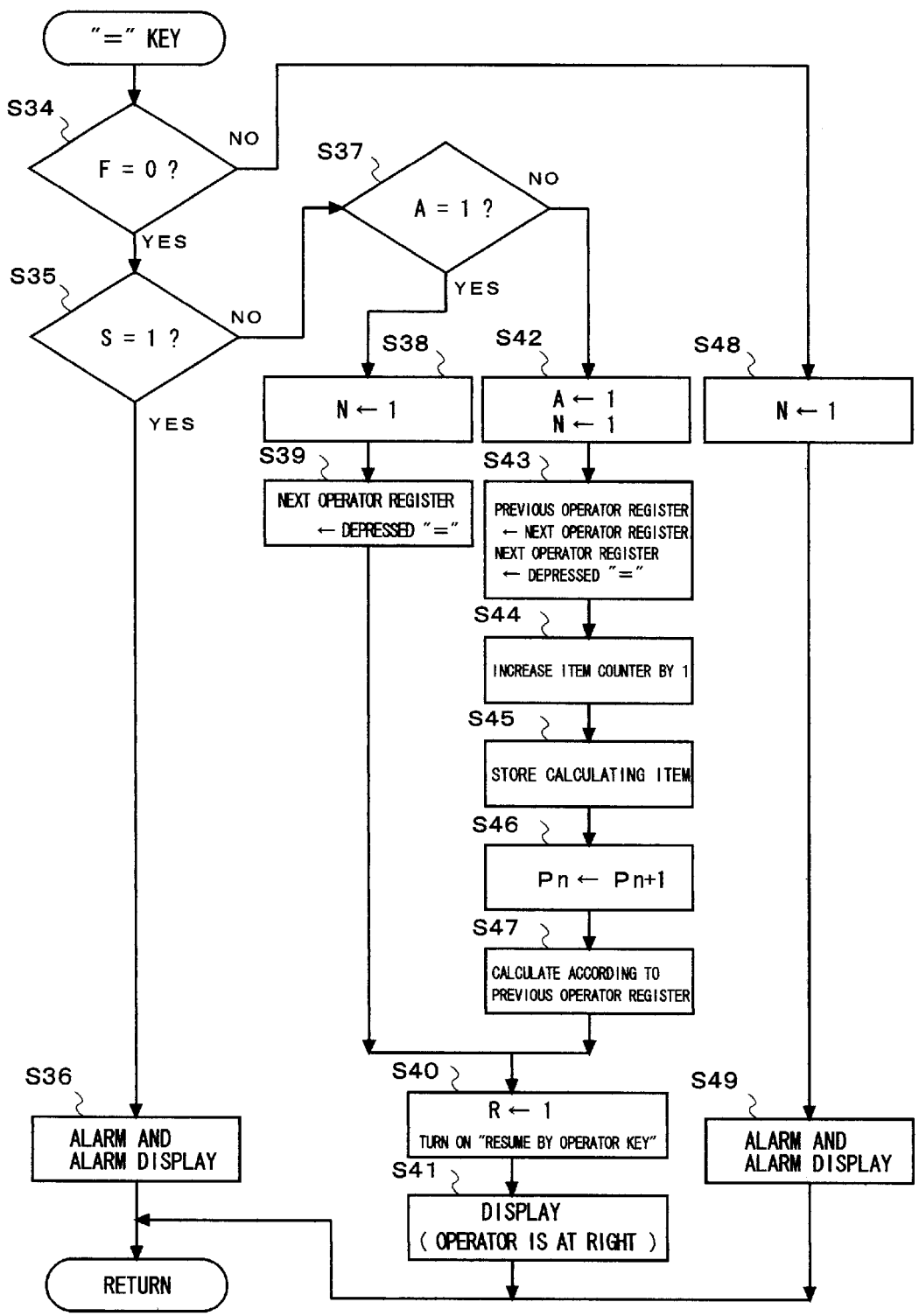
FIG. 9 is the flowchart of the processing flow of the embodiment in case that the equal key "=" is depressed.

FIG. 9 is the flowchart of the processing flow of the embodiment in case that the equal key "=" is depressed. (Be careful about that in this document the equal key "=" is not included in the operator key.)

(The movement of the equal key "=" at the ordinary calculator mode)

Briefly saying, the movement of the equal key "=" at the ordinary calculator mode is like next.

When the initialized status flag S is not "1" and the after operator flag A is not "1", the depressed "=" is inputted to the next operator register and the input history storing process and the arithmetic transaction according to the previous operator are executed and the result is displayed. Then the input of the numeric key is disabled in order to prevent the phenomenon that our input history storing memory can not maintain the proper consistency that operators and numerical values alternately appear after this "=" key is depressed.

When the initialized status flag S is "1", only the alarm sound "Pip" and the alarm display "♪" at the alarm display portion are made.

When the initialized status flag S is not "1" and the after operator flag A is "1", the depressed "=" is inputted to the next operator register 26 and the input of the numeric key is inhibited in order to prevent the phenomenon that our input history storing memory can not maintain the proper consistency that operators and numerical values alternately appear after this "=" key is depressed.

The detail is like next.

After the decision that the mode flag F is "0" (step S34), the next decision whether the initialized status flag S is "1" or not is made (step S35). When the initialized status flag S is "1", only the alarm sound "Pip" and the alarm display "♪" at the alarm display portion are made (step S36).

When the initialized status flag S is not "1", the next decision whether the after operator flag A is "1" or not is made (step S37). When the after operator flag A is "1", after the new figure input flag N is turned to "1" (step S38), the depressed "=" is inputted to the next operator register 26 (step S39). And the input of the numeric key is disabled by turning the numeric key inhibition flag R "1" in order to prevent the phenomenon that our input history storing memory can not maintain the proper consistency that operators and numerical values alternately appear, and the "RESUME BY OPERATOR KEY" is turned on (step S40). And the depressed "=" is displayed at the right operator display portion 6 (step S41).

When the initialized status flag S is not "1" and the after operator key A is not "1" the after operator flag A is reversed to "1" and the new figure input flag N is turned to "1" (step S42). Then the value of the next operator register 26 is transferred to the previous operator register 25 and the depressed "=" is inputted to the next operator register 26 (step S43). Then, after the item counter 24 is increased by "1" (step S44), the input history storing process is executed (step S45). Then, after the value of address pointer "Pn" is changed to "Pn+1" (step S46), the arithmetic transaction is made according to the value of the previous operator register 25 (step S47). And the input of the numeric key is disabled by turning the numeric key inhibition flag R "1" in order to prevent the phenomenon that our input history storing memory can not maintain the proper consistency that operators and numerical values alternately appear, and the "RESUME BY OPERATOR KEY" is turned on (step S40). Then the result is inputted to both the answer register 23 and the numeric value display register 18 and the value of the item counter 24 is inputted to both the item number display register 19 and the total item number display register 20 and these are displayed at the liquid crystal display portion 1 with the depressed "=displayed at the right operator display portion 6 (step S41).

(The movement of the equal key "=" at the input history display mode)

After the decision that the mode flag F is not "0" (step S34), the new figure input flag N is turned to "1" (step S48), then only the alarm sound "Pip" and the alarm display "♪" at the alarm display portion are made (step S49).

The AC (All Clear) Key 12b

Figure 17:
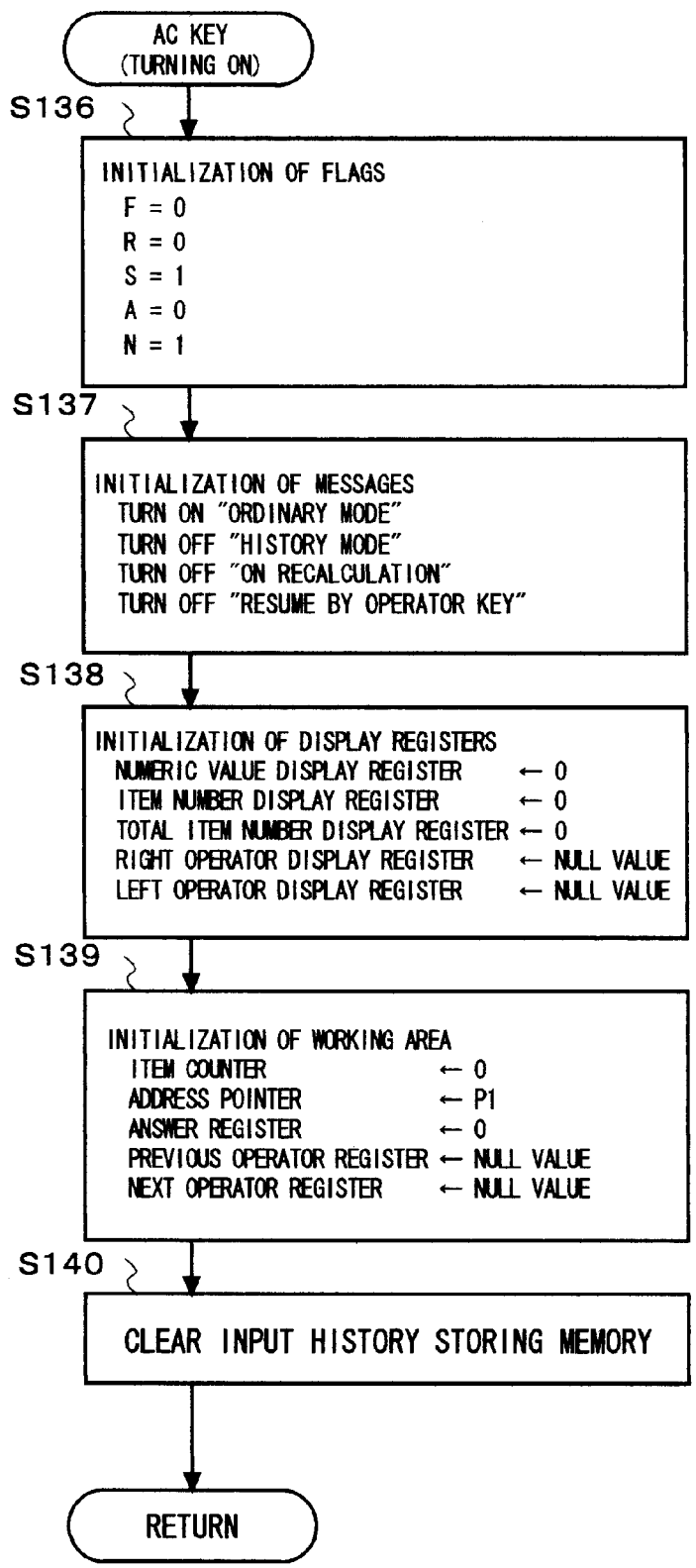
FIG. 17 is the flowchart of the processing flow of the embodiment in case that the AC key is depressed.

FIG. 17 is the flowchart of the processing flow of the embodiment in case that the AC key 12b is depressed. The movement of this AC key is same between the ordinary calculator mode and the input history display mode. The same subroutine and the same initialization are made just after the turning on too.

Briefly saying, the movement of the AC key 12b is like next.

The initialization of the flags and the message display portions and the display registers and the item counter and the address pointer and the working area like the answer register and the input history storing memory, etc, is executed by this AC key with the ordinary works of the AC key in the ordinary calculator.

The detail is like next.

Firstly, as the initialization of the flags, the mode flag F and the numeric key inhibition flag R, the after operator flag A are turned to "0", and the initialized status flag S and the new figure input flag N are turned to "1" (step S136).

Then as the initialization of the message display portions, the "ORDINARY MODE" is turned on and the "HISTORY MODE" and the "ON RECALCULATION" and the "RESUME BY OPERATOR KEY" are turned off (step S137).

Then as the initialization of the display registers, the initial value "0" is inputted to the numeric value display register 18 and the item number display register 19 and the total item number display register 20 and these value of the registers are displayed at the liquid crystal display portion 1 by the display control circuit 13 (step S138). Here the null value is inputted to the right operator display register 21 and the left operator display register 22 but the display control circuit 13 displays nothing at the right operator display portion 6 and the left operator display portion 7 in this embodiment.

Then as the initialization of the working area the "0" is inputted to the item counter 24 and "P1" that indicates the address of the first calculating item is inputted to the address pointer 27 and the initial value "0" is inputted to the answer register 23 and the null value is inputted to both the previous operator register 25, the next operator register 26 as a initial value (step S139).

Lastly as the initialization of the input history storing memory 30, the all stored data in this input history storing memory 30 is cleared (step S140). And the initializations that are needed for the ordinary calculator are also executed here.

In this embodiment, the each key mentioned above is given the independent button in order to be convenient for understanding, but these keys can be provided with the combinations of function keys and the other ordinary keys of the ordinary calculators.

From here, the movement of this embodiment will be described using the sample calculation work.

FIG. 5 and FIG. 6 are the schematic diagrams that show the key input operations and the corresponding statuses of the liquid crystal display portion 1 and the important flags and the previous operator register 25 and the next operator register 26 of this embodiment FIG. 6 is the next page of FIG. 5. In these FIG. 5 and FIG. 6, the important flags of the mode flag, the numeric key inhibition flag, the initialized status flag, the after operator key flag, the new figure input flag are shown respectively as "F""R", "S", "A", "N", and the previous operator register 25 is shown as "PREV", the next operator register 26 is shown as "NEXT".

The (a) of FIG. 5 shows the initial status of this embodiment just after the turning on or the depressing of the AC key.

At this moment, the value of the each flag is initialized to "F=0, R=0, S=1, A=0, N=1" by the step S136 and this embodiment works as the ordinary calculator mode according to the value "0" of the mode flag F. The "ORDINARY MODE" is displayed with the initial value "0" in the numeric value display register 18 and the initial value "0" in the item number display register 19 and the initial value "0" in the total item number display register 20 at the liquid crystal display portion 1. And the null value is inputted to the previous operator register 25 and the next operator register 26 by the step S139.

Firstly, There will now be described a case where the following calculating formula will be inputted.

"54×3−9="

There are two ways in order to begin the calculation like the above, the way to begin the storing of the calculating item deciding automatically the first operator that goes just before the first numeric value is the "+" by depressing the numeric key first and the way to begin the storing of the calculating item with the first depressed operator being stored as the first operator that goes just before the first numeric value by depressing the operator key first Here the former will be used.

The (b) of FIG. 5 shows the status just after the "5" of the "54×" is depressed.

At the subroutine of the numeric key FIG. 7, after the decision that the mode flag F is "0" and the numeric key inhibition flag R is not "1" and the initialized status flag S is "1", this initialized status flag S is reversed to "0" and the "+" is inputted to the next operator register 26 as the first operator. (This "+" is the first operator that goes before the numeric value "54", so this is not inputted to the right operator display register 21 and is not displayed at the liquid crystal display portion 1.) Then the after operator flag A is turned to "0" and after the decision that the new figure input flag N is "1" this new figure input flag N is reversed to "0" in order to enable the input of the next digit And the depressed "5" is inputted to the numeric value display register 18 as the head digit of the figure and both the initial value "0" in the item number display register 19 and the initial value "0" in the total item number display register 20 are increased by "1" and become "1" and "1" respectively. These are displayed at the liquid crystal display portion 1 by the display control circuit 13. (As is shown by the steps, S1→S2→S4→S5→S6→S7→S8→S9→S10→S11 at the FIG. 7.)

The (c) of FIG. 5 shows the status just after the "4" of the "54×" is depressed.

At the subroutine of the numeric key FIG. 7, after the decision that the mode flag F is "0", and the numeric key inhibition flag R is not "1" and the initialized status flag S is not "1", the after operator flag A is turned to "0" and after the decision that the new figure input flag N is not "1", the depressed "4" is added to the numeric value display register 18 as the foot digit of the figure. These are displayed at the liquid crystal display portion 1 by the display control circuit 13. (As is shown by the steps, S1→S2→S4→S5→S6→S7→S12→S11 at the FIG. 7.)

The (d) of FIG. 5 shows the status just after the "×" of the "54×" is depressed.

At the subroutine of the operator key FIG. 8, after the decision that the mode flag F is "0" and the initialized status flag S is not "1" and the numeric key inhibition flag R is not "1" and the after operator flag A is not "1", this after operator flag A is reversed to "1" and the new figure input flag N is turned to "1". Then the "+" in the next operator register 26 is transferred to the previous operator register 25 and the depressed "×" is inputted to this next operator register 26. Then the item counter 24 become "1" increased by "1", and, by the input history storing process, the current value "54" of the numeric value display register 18 and the current value "+" of the previous operator register 26 are stored into the first area of the input history storing memory 30 according to the initial value "P1" of the address pointer as the first calculating item. (Please see the FIG. 3 and FIG. 4 too.) Then "P2" is inputted to the address pointer 27 in order to prepare the next storage. Then the arithmetic transaction "0+54" is made with the initial value "0" of the answer register 23 according to the value (in this case, "+") of the previous operator register 25 and the result "54" is inputted to both the answer resister 23 and the numeric value display register 18. These are displayed at the liquid crystal display portion 1 by the display control circuit 13. Be careful about that the operator displayed at the right operator display portion 6 is not the "+" in the previous operator register 25 but the depressed "×", this is completely same with the ordinary calculator. (As is shown by the steps, S17→S18→S22→S24→S26→S27→S28→S29→S30→S31→S21 at the FIG. 8.)

The (e) of FIG. 5 shows the status just after the "3" of the "×3" is depressed.

At the subroutine of the numeric key FIG. 7, after the decision that the mode flag F is "0" and the numeric key inhibition flag R is not "1" and the initialized status flag S is not "1", the after operator flag A is turned to "0" and after the decision that the new figure input flag N is "1" this new figure input flag N is reversed to "0" in order to enable the input of the next digit And the depressed "3" is inputted to the numeric value display register 18 as the head digit of the figure and both the value "1" in the item number display register 19 and the value "1" in the total item number display register 20 are increased by "1" and become 2 and "2" respectively. These are displayed at the liquid crystal display portion 1 by the display control circuit 13. (As is shown by the steps, S1→S2→S4→S6→S7→S8→S9→S10→S11 at the FIG. 7.)

The (f) of FIG. 5 shows the status just after the "−" of the "−9" is depressed.

At the subroutine of the operator key FIG. 8, after the decision that the mode flag F is "0" and the initialized status flag S is not "1" and the numeric key inhibition flag R is not "1" and the after operator flag A is not "1", this after operator flag A is reversed to "1" and the new figure input flag N is turned to "1". Then the "×" in the next operator register 26 is transferred to the previous operator register 25 and the depressed "−" is inputted to this next operator register 26. Then the item counter 24 become "2" increased by "1", and, by the input history storing process, the current value "3" of the numeric value display register 18 and the current value "×" of the previous operator register 26 are stored into the second area of the input history storing memory 30 according to the value "P2" of the address pointer as the second calculating item. (Please see the FIG. 3 and FIG. 4 too.) Then "P3" is inputted to the address pointer 27 in order to prepare the next storage. Then the arithmetic transaction "54×3" is made with the value "54" of the answer register 23 according to the value (in this case, "×") of the previous operator register 25 and the result "162" is inputted to both the answer resister 23 and the numeric value display register 18. These are displayed at the liquid crystal display portion 1 by the display control circuit 13. Be careful about that the operator displayed at the right operator display portion 6 is not the "×" in the previous operator register 25 but the depressed "−", this is completely same with the ordinary calculator. (As is shown by the steps, S17→S18→S22→S24→S26→S27→S28→S29→S30→S31→S21 at the FIG. 8.)

The (g) of FIG. 5 shows the status just after the "9" of the "−9" is depressed.

At the subroutine of the numeric key FIG. 7, after the decision that the mode flag F is "0" and the numeric key inhibition flag R is not "1" and the initialized status flag S is not "1", the after operator flag A is turned to "0" and after the decision that the new figure input flag N is "1" this new figure input flag N is reversed to "0" in order to enable the input of the next digit And the depressed "9" is inputted to the numeric value display register 18 as the head digit of the figure and both the value "2" in the item number display register 19 and the value "2" in the total item number display register 20 are increased by "1" and become "3" and "3" respectively. These are displayed at the liquid crystal display portion 1 by the display control circuit 13. (As is shown by the steps, S1→S2→S4→S6→S7→S8→S9→S10→S11 at the FIG. 7.)

After this, the above steps are repeated by depressing of the numeric keys and the operator keys, and the calculating items are stored into the input history storing memory 30 indicated by the address pointer 27 as such pairs of the numeric value and the operator that goes just before it And the arithmetic transactions are executed and the each result of the calculation is inputted to both the answer register 23 and the numeric value display register 18 and is displayed with the number and the total number at the liquid crystal display portion 1 by the display control circuit 13.

The (h) of FIG. 5 shows the status just after the "=" key is depressed here.

At the subroutine of the "=" key FIG. 9, after the decision that the mode flag F is "0" and the initialized status flag S is not "1" and the after operator flag A is not "1", this after operator flag A is reversed to "1" and the new figure input flag N is turned to "1". Then the "−" in the next operator register 26 is transferred to the previous operator register 25 and the depressed "=" is inputted to this next operator register 26. Then the item counter 24 become "3" increased by "1", and, by the input history storing process, the current value "9" of the numeric value display register 18 and the current value "−" of the previous operator register 26 are stored into the third area of the input history storing memory 30 according to the value "P3" of the address pointer as the third calculating item. (Please see the FIG. 3 and FIG. 4 too.) Then "P4" is inputted to the address pointer 27 in order to prepare the next storage. Then the arithmetic transaction "162−9" is made with the value "162" of the answer register 23 according to the value (in this case, "−") of the previous operator register 25 and the result "153" is inputted to both the answer resister 23 and the numeric value display register 18. These are displayed at the liquid crystal display portion 1 by the display control circuit 13.

Here, Be careful that, if you try to resume your calculation successively just after this "=" key was depressed, the value of the next operator register 26 becomes the "=" or, in case that the "=" is not inputted to this register, the "unsettled meaningless operator" that remains by having been inputted in the past Consequently, the operator that connects the already stored calculating formula and the numeric value coming next must be this "=" or the "unsettled meaningless operator", so our input history storing memory can not maintain the proper consistency that operators and numerical values alternately appear. (You must be careful that the same phenomenon occurs just after you executed the recalculation.) Therefore, here, the embodiment inhibits the input of the numeric value by turning the numeric key inhibition flag R to "1" and urges the user to input the right operator by turning on the "RESUME BY OPERATOR KEY". (As is shown by the steps, S34→S35→S37→S42→S43→S44→S45→S46→S47→S40→S41 at the FIG. 9.)

The (i) of FIG. 5 shows the status just after the numeric key "5" is depressed here.

If some numeric key is depressed when this "RESUME BY OPERATOR KEY" is being displayed, at the subroutine of the numeric key FIG. 7, after the decision that the mode flag F is "0" and the numeric key inhibition flag R is "1", only the alarm sound "Pip" and the alarm display "♪" at the alarm display portion are made in order to inform the user that the numeric keys are being disabled. (As is shown by the steps, S1→S2→S3 at the FIG. 7.)

As for the sample that shows the way to cancel the inhibition and to resume the calculation following next and the storage of the calculating items at this status will be described later. Here will now be described the samples of the way to enter the input history display mode and the movement of the embodiment at this input history display mode.

The (j) of FIG. 5 shows the status just after the mode-switching key (or the recalculation key) is depressed.

At the subroutine of the mode-switching key FIG. 10, after the decision that the mode flag F is "0", this mode flag F is reversed to "1" and the "HISTORY MODE" is turned on. Then the new figure input flag N is turned to "1" in order to prepare for the input of the correct figure and the numeric key inhibition flag R is turned to "0"0 and "RESUME BY OPERATOR KEY" is turned off at the status where the input of numeric key is inhibited. Then the "P1" is inputted to the address pointer 27 and the reading out process from the input history storing memory 30 indicated by this "P1" is executed and the read out operator and the numeric value (in this case, "+54") is inputted to both the left operator display register 22 and the numeric value display register 18, with the number of the calculating item "1" read out or calculated from the address value being inputted to the item number display register 19 and the value of the item counter 24 "3" being inputted to the total item number display register 20. These are displayed at the liquid crystal display portion 1 by the display control circuit 13. Be careful about that the operator is displayed at the left operator display portion 7 by being inputted to the left operator display register 22 at the input history display mode. (As is shown by the steps, S50→S51→S52→S53→S54→S55→S56 at the FIG. 10.)

The (k) and (l) of FIG. 5 show the status just after the next key is depressed here at this input history display mode successively.

At the subroutine of the next key FIG. 11, after the decision that the mode flag F is not "0" and the decision that the currently displaying item is not the last calculating item, the new figure input flag N is turned to "1" in order to prepare the input of the correct figure, and the address pointer is changed to "Pn+1", and the reading out process from the input history storing memory 30 indicated by this "Pn+1" is executed and the read out operator and the numeric value are inputted to the left operator display register 22 and the numeric value display register 18, with the number of the calculating item read out or calculated from the address value being inputted to the item number display register 19 and the value of the item counter 24 being inputted to the total item number display register 20. These are displayed at the liquid crystal display portion 1 by the display control circuit 13. In this way, the calculating items stored in the input history storing memory 30 are read out one after another in the order they have been stored and displayed as the pairs of the numeric value and the operator that goes just before it with the number and the total number of them. (As is shown by the steps, S68→S75→S77→S78→S79→S80 at the FIG. 11.)

The (m) of FIG. 5 shows the status just after the next key is depressed here where the stored last calculating item is being displayed.

At the subroutine of the next key FIG. 11, after the decision that the mode flag F is not "0" and the decision that the currently displaying item is the stored last calculating item, only the alarm sound "Pip" and the alarm display "♪" at the alarm display portion are made and the user can know that there is not any next stored calculating item. (As is shown by the steps, S68→S75→S76 at the FIG. 11.)

The (n) of FIG. 5 shows the status just after the back key is depressed here at the input history display mode.

At the subroutine of the next key FIG. 12, after the decision that the mode flag F is not "0" and the decision that the currently displaying item is not the first calculating item, the new figure input flag N is turned to "1" in order to prepare the input of the correct figure, and the address pointer is changed to "Pn−1", and the reading out process from the input history storing memory 30 indicated by this "Pn−1" is executed and the read out operator and the numeric value are inputted to the left operator display register 22 and the numeric value display register 18, with the number of the calculating item read out or calculated from the address value being inputted to the item number display register 19 and the value of the item counter 24 being inputted to the total item number display register 20. These are displayed at the liquid crystal display portion 1 by the display control circuit 13. In this way, the calculating items stored in the input history storing memory 30 are read out one after another in the reverse order of the order they have been stored and displayed as the pairs of the numeric value and the operator that goes just before it with the number and the total number of them. (As is shown by the steps, S81→S88→S90→S91→S92→S93 at the FIG. 12.)

There is not shown in the FIG. 5 but when the back key is depressed at the status where the stored first calculating item is being displayed the movement of this embodiment is like next.

At the subroutine of the back key FIG. 12, after the decision that the mode flag F is not "0" and the decision that the currently displaying item is the stored first calculating item, only the alarm sound "Pip" and the alarm display "♪" at the alarm display portion are made and the user can know that there is not any previous stored calculating item. (As is shown by the steps, S81→S88→S89 at the FIG. 12.)

Here, let us suppose that a mistake of a calculating item is discovered at this input history display mode. In this case we suppose that the second calculating item "×3" is wrong and we should have inputted it as "÷2" and the correct calculating formula should be like next.

"54÷2−9="

The (o) of FIG. 5 shows the status just after the "÷" key is depressed here where the wrong calculating item that should be corrected is being displayed.

At the subroutine of the operator key FIG. 8, after the decision that the mode flag F is not "0" the new figure input flag N is turned to "1", the depressed operator "÷" is inputted to the left operator display register 22 and displayed at the left operator display portion 7. The other displays are unchanged. (As is shown by the steps, S17→S32→S33 at the FIG. 8.)

The (p) of FIG. 5 shows the status just after the "2" key is depressed here successively where the wrong calculating item that should be corrected is being displayed.

At the subroutine of the operator key FIG. 8, after the decision that the mode flag F is not "0" and the next decision that the new figure input flag N is "1", this new figure input flag N is reversed to "0" in order to make the next depressed numeric value the foot digit of the correct figure. Then the depressed correct numeric value "2" is inputted to the numeric value display register 18 as the head digit of the figure and is displayed at the liquid crystal display portion 1 by the display control circuit 13. (As is shown by the steps, S1→S13→S14→S15→S11 at the FIG. 7.)

The (q) of FIG. 5 shows the status just after the substitution key is depressed here successively where the corrected operator and numeric value are being displayed.

At the subroutine of the operator key FIG. 8, after the decision that the mode flag F is not "0", the substitution process that replaces the numeric value and the operator in the input history storing memory 30 indicated by the current value of the address pointer 27 with the currently displaying numeric value in the numeric value display register 18 and the currently displaying operator in the left operator display register 22 is executed. Then the "OK" mark is displayed and the sound "Pip, Pip" is made in order to inform that the substitution of the numeric value and operator has succeeded. (As is shown by the steps, S94→S96→S97 at the FIG. 13.)

Here, the success of the substitution can be also confirmed by displaying the calculating items around the place where the substitution was executed, using the next key and the back key repeatedly over and over. And if the substitution key was not depressed, the corrected new figure and operator are not reflected on the input history storing memory. The non-reflection can be also confirmed by displaying the calculating items around the place where the substitution was about to be tried but not executed, using the next key and back key repeatedly over and over.

The (r1) of FIG. 5 shows the status just after the mode-switching key (the recalculation key) is depressed after the confirmation and the correction was made.

At the subroutine of the mode-switching key FIG. 10, after the decision that the mode flag F is not "0", this mode flag F is turned to "0" and the "ORDINARY MODE" is turned on, and, at the same time, the answer register 23 is initialized to "0" as a preparation of the recalculation, and the "ON RECALCULATION" is turned on. Continuously, the address pointer 27 is changed to "P1" that are the address of the first calculating item stored in the input history storing memory 30, and the reading out process from the input history storing memory 30 is executed by being indicated by this address pointer 27, and the read out calculating item is displayed with the number and the total number of the item. Here, the (r1) of FIG. 5 shows the status just on this recalculation where the first calculating item "+54" is being displayed. And, the arithmetic transaction is made according to the operator that is displayed just left side of the each numeric value, and the answer is inputted to the answer register 23. And the address pointer 27 is changed to "Pn+1" for preparation of the next reading out process. And, the decision whether the treated calculating item was the last calculating item or not is made, and if it was not the last item the steps S60 to S 63 are repeated and the new answer is inputted to the answer register 23 each time. And if it was the last item the "ON RECALCULATION" is turned off and the value of the answer register 23 is transferred to the numeric value display register 18 and the last result of the recalculation is displayed.

Here, if you try to resume your calculation successively just after this recalculation, the operator that connects the already stored calculating formula and the numeric value coming next must be the "=" or the "unsettled meaningless operator" that remains by having been inputted in the past, so our input history storing memory can not maintain the proper consistency that operators and numerical values alternately appear. Therefore, here, the embodiment inhibits the input of the numeric value by turning the numeric key inhibition flag R to "1" and urges the user to input the right operator by turning on the "RESUME BY OPERATOR KEY". And after this, the after operator flag A and the new figure input flag N are turned to "1" in order to prepare for resuming the input of new figure. Here, the (r2) of FIG. 5 shows the status just this recalculation was completed and the corrected right answer "18" is displayed. (As is shown by the steps, S50→S57→S58→S59→S60→S61→S62→S63→S64→S65→S66→S67 at the FIG. 10.)

There can be some way by the condition like the power of CPU or the amount of calculation items as for the display of the each calculating item on the way of the recalculation. If the speed is preferred this embodiment can not be provided with the display of the each calculating item on the way of the recalculation, and if the speed is not so preferred this embodiment can be provided with the display of the each calculating item, and there can be the case that this embodiment is provided with a selection switch of this display of the each calculating item on the way of the recalculation.

Here will now be described the samples of the way to cancel the inhibition of numeric value and to resume the calculation and the storage of the calculating items.

This movement of the resuming becomes necessary at the (r2) of the FIG. 5 that comes just after the recalculation is executed and at the (h) of the FIG. 5 that comes just after the "=" key is depressed. At the above two cases, if we try to resume our calculation successively, the operator that has been already in the next operator register 26 and will be involved in to connect the already stored calculating formula and the numeric value coming next must be the "=" or the "unsettled meaningless operator" that remains by having been inputted in the past In these two cases, we can not execute the right calculation because our input history storing memory can not maintain such proper consistency that operators and numerical values alternately appear like next.

"1+2−3+4@5−6+ . . . "

(Here the "@" means the "=" or the "unsettled meaningless operator".)

Therefore, here, a requirement is generated, wherein the "=" or the "unsettled meaningless operator" that remains by having been inputted in the past must be substituted with the proper and right operator that connects the already stored calculating formula and the numeric value coming next.

FIG. 6 is the next page of FIG. 5 and is the schematic diagram that shows the key input operations and the corresponding statuses of the liquid crystal display portion 1 and the important flags and the previous operator register 25 and the next operator register 26 of this embodiment.

The (s) of FIG. 6 shows the status just after the numeric key (in this case "2") is depressed at the status of the (r2) of FIG. 5.

At the status that the "RESUME BY OPERATOR KEY" is being displayed with the answer after the recalculation, if we try to input the numeric value successively, only the alarm sound "Pip" and the alarm display "♪" at the alarm display portion are made after the decision that the mode flag F is "0" and that the numeric key inhibition flag R is "1", and we can be only informed that the numeric keys are disabled. (As is shown by the steps, S1→S2→S3 at the FIG. 7.) This movement is same with the (i) of FIG. 5 where the numeric keys are disabled after the depressing of the "=" key.

The way to resume the calculation and the storage of the calculating items at this numeric key inhibited status is, as is shown by the guidance of the "RESUME BY OPERATOR KEY", by the way that the user selects the right operator that connects the already stored calculating formula and the numeric value coming next by depressing the one of the operator key at first.

The (t) of FIG. 6 shows the status just after the "×" is depressed in order to continue the calculation like the "×5".

At the subroutine of the operator key FIG. 8, after the decision that the mode flag F is "0" and the initialized status flag is not "1" and the numeric key inhibition flag R is "1", this numeric key inhibition flag R is reversed to "0" and the "RESUME BY OPERATOR KEY" is turned off. And the depressed operator of the "+", "−", "×", "÷" is inputted to the next operator register 26 in order to make this operator be the operator that should connect properly between the already stored calculating formula and the numeric value that comes next after the suspending the calculation, and is displayed at the right operator display portion 6.

(Be careful about that at this (t) of FIG. 6, the "−" is accommodated in the previous operator register 25. But this "−" is the operator that has been involved in there transferred from the next operator register 26 at the (h) of FIG. 5 where the "=" key was depressed in order to make the calculation "−9". Therefore, this "−" is the "unsettled meaningless operator" that remains by having been inputted in the past But, in this embodiment, it is certain that this "−" is substituted with the "×" that is currently in the next operator register 26 and will be transferred to the previous operator register 25 when the "5" of the "×5" and the next operator is depressed. And the actual arithmetic transaction is made according to this "×", so there is no problem.)

The (u) of FIG. 6 shows the status just after the "5" of the "×5" is depressed.

At the subroutine of the numeric key FIG. 7, after the decision that the mode flag F is "0" and the numeric key inhibition flag R is not "1" and the initialized status flag S is not "1", the after operator flag A is turned to 101 and after the decision that the new figure input flag N is "1" this new figure input flag N is reversed to "0" in order to enable the input of the next digit. And the depressed "5" is inputted to the numeric value display register 18 as the head digit of the figure and both the value "3" in the item number display register 19 and the value "3" in the total item number display register 20 are increased by "1" and become "4" and "4" respectively. These are displayed at the liquid crystal display portion 1 by the display control circuit 13. (As is shown by the steps, S1→S2→S4→S6→S7→S8→S9→S10→S11 at the FIG. 7.)

The (v) of FIG. 6 shows the status just after the "+" is depressed successively.

At the subroutine of the operator key FIG. 8, after the decision that the mode flag F is "0" and the initialized status flag S is not "1" and the numeric key inhibition flag R is not "1" and the after operator flag A is not "1", this after operator flag A is reversed to "1" and the new figure input flag N is turned to "1". Then the "×" in the next operator register 26 is transferred to the previous operator register 25 and the depressed "+" is inputted to this next operator register 26. Then the item counter 24 become "4" increased by "1", and, by the input history storing process, the current value "5" of the numeric value display register 18 and the current value "×" of the previous operator register 26 are stored into the fourth area of the input history storing memory 30 according to the value "P4" of the address pointer as the fourth calculating item. Then "P5" is inputted to the address pointer 27 in order to prepare the next storage. Then the arithmetic transaction "18×5" is made with the value "18" of the answer register 23 according to the value (in this case, "×") of the previous operator register 25 and the result "90" is inputted to both the answer resister 23 and the numeric value display register 18. These are displayed at the liquid crystal display portion 1 by the display control circuit 13. Be careful about that the operator displayed at the right operator display portion 6 is not the "×" in the previous operator register 25 but the depressed "+", this is completely same with the ordinary calculator. (As is shown by the steps, S17→S18→S22→S24→S26→S27→S28→S29→S30→S31→S21 at the FIG. 8.)

From here, the one of the important feature and effect of this embodiment combined with the back key or the next key or the movement key will be described using the sample calculation work.

This embodiment can also change its mode by the back key or by the next key or by the movement key other than by the mode-switching key and can display the calculating item that the user wants to display by turning the mode flag to "1". When the back key is depressed, this embodiment displays the last stored calculating item just after switching to the input history display mode. When the next key is depressed, this embodiment displays the first stored calculating item just after switching to the input history display mode. When the movement key is depressed this embodiment displays the stored calculating item that has the number corresponds the current value of the numeric value display portion 5 just after switching to the input history display mode. In these three, the movement of the next key is completely same with the mode-switching key, so here will be described about the back key and the movement key using the sample calculation work.

The (w) of FIG. 6 shows the status just after the back key is depressed during the calculation work at the ordinary calculator mode like the status of the (v) of FIG. 6.

At the subroutine of the back key FIG. 12, after the decision that the mode flag F is "0" this mode flag F is reversed to "1" and the "HISTORY MODE" is turned on, and the new figure input flag N is turned to "1" in order to enable the input of new figure, and the numeric key inhibition flag R is turned to "0" and the "RESUME BY OPERATOR KEY" is turned off. And the address of the last stored calculating item in the input history storing memory 30 is inputted to the address pointer 27, and the last stored calculating item is read out from the input history storing memory 30 indicated by the address pointer 27, and the operator and the numeric value of the last stored calculating item (in this case the fourth "×" and "5") are inputted to both the left operator display register 22 and the numeric value display register 18, with the number of the calculating item "4" read out or calculated from the address value being inputted to the item number display register 19 and the value of the item counter 24 "4" being inputted to the total item number display register 20. These are displayed at the liquid crystal display portion 1 by the display control circuit 13. Be careful about that the operator is displayed at the left operator display portion 7 by being inputted to the left operator display register 22 at the input history display mode. (As is shown by the steps, S81→S82→S83→S84→S85→S86→S87 at the FIG. 12.)

Here, we can display the calculating items one after another at will using the back key and the next key and the movement key and can correct the calculating item by the substitution key just like the case we entered the input history display mode by depressing the mode-switching key.

Here It can be said that we could obtain a very effective means wherein the sequential works of confirming the calculating items that has been inputted just before and restarting the calculation just after the confirmation and the correction of those are enabled by the combination of the following means, the means that the calculating item stored last is displayed just after entering the input history display mode by depressing the back key, and the means that recalculation is executed just after returning to the ordinary calculator mode, and, furthermore, the means that the resuming of the calculation is enabled with our input history storing memory being maintained such proper consistency that operators and numerical values alternately appear.

The (x) of FIG. 6 shows the status just after the "2" is depressed in order to indicate the second calculating item preparing for the depress of the movement key. The "2" is displayed at the numeric value display portion 5.

The (y) of FIG. 6 shows the status just after the movement key is depressed here.

At the subroutine of the movement key FIG. 14, after the decision that the mode flag F is "0", this mode flag F is reversed to "1" and the "HISTORY MODE" is turned on. Then the new figure input flag N is turned to "1" in order to enable the input of new figure and the numeric key inhibition flag R is turned to "0" and the "RESUME BY OPERATOR KEY" is turned off. And the address of the indicated calculating item is inputted to the address pointer 27, then the reading out process of calculating item is executed, and the operator and the numeric value of the indicated calculating item (in this case the second "÷" and "2") are inputted to the left operator display register 22 and the numeric value display register 18, with the number of the calculating item "2" read out or calculated from the address value being inputted to the item number display register 19 and the value of the item counter 24 "4" being inputted to the total item number display register 20. These are displayed at the liquid crystal display portion 1 by the display control circuit 13. Be careful about that the operator is displayed at the left operator display portion 7 by being inputted to the left operator display register 22 at the input history display mode. (As is shown by the steps, S98→S99→S100→S101→S102→S103→S104→S105 at the FIG. 14.)

Here, we can display the calculating items one after another at will using the back key and the next key and the movement key and can correct the calculating item by the substitution key just like the case we entered the input history display mode by depressing the mode-switching key.

Here It can be also said that we could obtain one more very effective means wherein the sequential works of confirming the calculating items near where the user supposed to have mistaken just after switching to the input history display mode and restarting the calculation just after the confirmation and the correction of those are enabled by the combination of the following means, the means that the calculating item indicated by the item number is displayed just after entering the input history display mode by depressing the movement key, and the means that recalculation is executed just after returning to the ordinary calculator mode, and, furthermore, the means that the resuming of the calculation is enabled with our input history storing memory being maintained such proper consistency that operators and numerical values alternately appear.

This movement key works almost same at the input history display mode too except changing the mode and the display of the mode.

From here, the movement of the insert key and the delete key will be described using the sample calculation work.

The (z1) of FIG. 6 shows the status just after the insert key is depressed at the status like the (y) of FIG. 6.

At the subroutine of the insert key FIG. 15, after the decision that the mode flag F is not "0", the current value of the address pointer 27 is stored into the temporary storage register for the address pointer 28, and the address of the last calculating item is inputted to this address pointer 27. Then the reading out process is executed. Continuously the address pointer 27 that has currently "Pn" as its value is changed to "Pn+1", and the calculating item is transferred to the next area indicated by this "Pn+1". Continuously the address pointer 27 is changed to "Pn−2" in order to prepare the next migration. Here, the decision whether the current position is the original position where the insertion was intended or not is made. These processes are repeated until this migration of calculating item reaches the original position where the insertion was intended. And when it reaches the original position where the insertion was intended, the "+" and "0" are stored as the initial value of the operator and the numeric value. Lastly, the value of the item counter 24 is increased by "1", and the initial value of new calculating item "+0" is displayed with the number and the total number. (Here, the operator is displayed at the left operator display portion 7.)

As a result of the above process, the second calculating item "÷2", the third item "−9", the fourth item "×5" are respectively changed to the third calculating item "÷2", the fourth item "−9", the fifth item "×5", and "+0" is inserted as a second item and displayed with the "2" in the item number display register 19 and the value of the item counter 24 "5" being inputted to the total item number display register 20. These are displayed at the liquid crystal display portion 1 by the display control circuit 13. (As is shown by the steps, S113→S115→S116→S117→S118→S119→S120→S121→S122→S123 at the FIG. 15.)

This inserted initial value "+0" can be replaced by the substitution key. This movement was described at the (o) and (p) and (q) of FIG. 6.

Then, the movement of the delete key will be described.

The (z2) of FIG. 6 shows the status just after the delete key is depressed. (Here we suppose that the second item "+0" should be deleted.)

At the subroutine of the delete key FIG. 16, after the decision that the mode flag F is not "0", the current value of the address pointer 27 is stored into the temporary storage register for the address pointer 28, And the address pointer 27 that has currently "Pn" as it's value is changed to "Pn+1", then the reading out process is executed. Continuously the read out calculating item is migrated to the next area indicated by the address pointer 27 being changed to "Pn−1". Then, the address pointer 27 is changed to "Pn+1" in order to prepare the next migration and here the decision whether the current item is the last item or not is made. If it was not the last item, these processes are repeated until this migration of calculating item reaches the last position. And if it was the last item, the item counter 24 is decreased by "1" and the memory area where the last calculating item has been stored is cleared. Then after the value of the temporary storage register for the address pointer 28 is backed to the address pointer 27, the reading out process is executed, and the new second item "÷2" is displayed with the number and the total number.

As a result of the above process, the third calculating item "÷2", the fourth item "−9", the fifth item "×5" are respectively changed to the second calculating item "÷2", the third item "−9", the fourth item "×5", and the "+0" is deleted and the new second item "÷2" is displayed with the "2" in the item number display register 19 and the value of the item counter 24 "4" being inputted to the total item number display register 20. These are displayed at the liquid crystal display portion 1 by the display control circuit 13. (As is shown by the steps, S124→S126→S127→S128→S129→S130→S131→S132→S133→S134→S135 at the FIG. 16.)

As for the two ways in order to begin the calculation, the way to begin the storing of the calculating item deciding automatically the first operator that goes just before the first numeric value is the "+" by depressing the numeric key first was described at the (b) of FIG. 5. So, here, finally, the way to begin the storing of the calculating item with the first depressed and selected operator being stored as the first operator that goes just before the first numeric value by depressing the operator key first will be now described.

The (b') of FIG. 6 shows the status just after the operator key "−" is depressed at the initialized status just like the (a) of FIG. 5.

At the subroutine of the operator key FIG. 8, after the decision that the mode flag F is "0", and the initialized status flag S is "1", this initialized status flag S is reversed to "0" and the after operator flag A is turned to "1". And the depressed operator "−" is inputted to the next operator register 26 and is displayed at the right operator display portion 6. When the next figure and operator are depressed, this "−" is transferred to the previous operator register 25 and the arithmetic transaction is made according to this "−" and, at the same time, this "−" is stored into the input history storing memory as the first operator that should be placed and stored just before the first numeric value of the calculating formula. (As is shown by the steps, S17→S18→S19→S20→S21 at the FIG. 8.)

As set firth above, this invention can largely relieve the many people from the pains and anxieties of the ordinary daily calculation works.

The major effects are like the followings.

The confirmation works of the inputted calculating items became very easy and steady by the means that enables us the visual confirmation of those together with the numbers and the total number at will through the minimum touch of the next key and the back key and the movement key.

The user can be informed reliably that there is no next or previous or indicated stored calculating item by the alarm means and the alarm display means.

The number and the total number of the calculating items enable us to grasp the absolute position and the relative position of the current calculating item among the all and are very useful for discovering the mistake and confirming the accuracy of the inputted calculating formula. There are often such cases wherein the total number of the calculating item on the paper is easily obtainable. If the total number indicates "49" after the series of calculations where the total number of the calculating item on the paper is supposed to be "50", the skip typing mistake is obvious and the mistook position can be easily obtained by displaying the calculating items together with the number and the total number of those.

The contents of the input history storing memory can be maintained completely same with the calculating formula on the paper very reliably and the accuracy of the inputted items can be kept trustworthy even after the skip typing mistake like the above or the double typing mistake by the insert means and the delete means of the calculating items.

The correction of the inputted item is easy by the means of the substitution key and the certainty of that correction is very reliable by the display "OK" and the sound "Pip, Pip" in order to inform that the substitution has succeeded.

After the above correction or the confirmation, the right answer can be obtained by the only one depression of the mode-switching key with which the calculating items are read out automatically from the first to the last just at the same time with entering the ordinary calculator mode.

Furthermore, by having a means that, after the recalculation like the above, inhibits the reopening of such an input that is not able to maintain such consistency that operators and numerical values alternately appear, and a means for restarting the calculation by canceling that inhibition maintaining consistency that operators and numerical values alternately appear, we are enabled to continue the left calculation work and the storing of them making the selected operator the proper and right operator that connects the already stored calculating formula and the numeric value coming next.

Further, by having a display means which inform the user that the above means that inhibits the reopening of such an input that is not able to maintain such consistency that operators and numerical values alternately appear has executed and how to cancel the inhibition and restart the calculation, the user can know that the numeric keys are disabled and how to cancel it and resume the calculation.

Further, we often feel anxious about the accuracy of the calculating items that has been inputted just a few times before on our calculation work But here we could obtain a very effective means wherein the sequential works of confirming the calculating items that has been inputted just before and restarting the calculation just after the confirmation and the correction of those are enabled by the combination of the following means, the means that the calculating item stored last is displayed just after entering the input history display mode by depressing the back key, and the means that recalculation is executed just after returning to the ordinary calculator mode, and, furthermore, the means that the resuming of the calculation is enabled with our input history storing memory being maintained such proper consistency that operators and numerical values alternately appear.

Further, we often feel anxious about the accuracy of the calculating items that has been inputted on the way of the large amount of calculation after we finished them once. But here we could obtain one more very effective means wherein the sequential works of confirming the calculating items near where the user supposed to have mistaken just after switching to the input history display mode and restarting the calculation just after the confirmation and the correction of those are enabled by the combination of the following means, the means that the calculating item indicated by the item number is displayed just after entering the input history display mode by depressing the movement key, and the means that recalculation is executed just after returning to the ordinary calculator mode, and, furthermore, the means that the resuming of the calculation is enabled with our input history storing memory being maintained such proper consistency that operators and numerical values alternately appear.

Furthermore, this invention provides us with very high understandability, by having two operator display portion at the right and the left of the numeric value display portion and by having a means which, at the ordinary calculator mode, displays the operator which comes just after the numeric value at the right operator display portion and, at the input history display mode, displays the operator which goes just before the numeric value at the left operator display portion.

Further, this invention provide us with very flexible way of calculation style wherein we can make the first operator of the calculating formula either the "+" automatically or the selected operator by depressing the right operator that should be the first operator of the calculating formula at the initialized status after the depressing of the AC key or the turning on.

What is claimed is:

1. An electronic calculator comprising:
    memory means which stores each inputted calculating item consisted of an operator and a numerical value into input history storing memory at ordinary calculator mode;
    means for displaying each calculating item stored into input history storing memory at input history display mode;
    means for making each displayed calculating item stored into input history storing memory correctable;
    recalculation means which automatically calls stored calculating item one after another from the first for recalculation and shows answer of the recalculation; and further
        means which, at ordinary calculation course and after recalculation, inhibits such an input that is not able to maintain such consistency in input history storing memory that operators and numerical values alternately appear, and
        means for resuming calculation and storing of calculating item following next by canceling the inhibition maintaining consistency in input history storing memory that operators and numerical values alternately appear.

2. The electronic calculator of claim 1, wherein the reopening of the calculations and the storing of the calculating items following next are prepared by comprising
    means which executes continuously, just after returning to the ordinary calculator mode,
    the said recalculation means which automatically calls the stored calculating item one after another from the first for recalculation and displays the answer of the recalculation,
    and the said means which inhibits the input that is not able to maintain such consistency in the input history storing memory that the operators and the numerical values alternately appear.

3. The electronic calculator of claim 1, further comprising:
    means which informs the user that
    the said means which inhibits such an input that is not able to maintain such consistency in the input history storing memory that the operators and the numerical values alternately appear has executed
    and the way how to cancel the inhibition and resume the calculation following next.

4. The electronic calculator of claim 1, wherein the calculating items that has been inputted near the last can be displayed just after switching to the input history mode by quick looking back means,
    and, after the confirmation or the correction of those, the reopening of the calculations and the storing of the calculating items following next are prepared by comprising
        the means which executes continuously, just after returning to the ordinary calculator mode,
        the said recalculation means which automatically calls the stored calculating item one after another from the first for recalculation and displays the answer of the recalculation and the said means which inhibits the input that is not able to maintain such consistency in the input history storing memory that the operators and the numerical values alternately appear.

5. The electronic calculator of claim 1, wherein the calculating items near where the user supposed to have mistaken can be displayed just after switching to the input history display mode by indicating the number of the calculating item, and, after the confirmation or the correction of those, the reopening of the calculations and the storing of the calculating items following next are prepared by comprising the said means which executes continuously, just after returning to the ordinary calculator mode, the said recalculation means which automatically calls the stored calculating item one after another from the first for recalculation and displays the answer of the recalculation and the said means which inhibits the input that is not able to maintain such consistency in the input history storing memory that the operators and the numerical values alternately appear.

6. The electronic calculator of claim 1, comprising:

the alarm means and the display means of the numbers and the total number of the stored calculating items with which the user can be informed reliably that there is no next item and the current item is the position where the user should resume the calculation or that there is no previous item and the current item is the first item where the user had begun the storing the calculation formula or there is no item which has the number the user indicated.

7. The electronic calculator of claim 1, comprising:

display portion of the number of the items and the total number of the calculating items which inform the user the absolute position and the relative position of the current item among the all calculating items, and means that the consistency in the input history storing memory that the operators and the numerical values alternately appear is maintained even after the calculating items are inserted and deleted.

8. The electronic calculator of claim 1, further comprising:

two operator display portion at the right and the left of the numeric value display portion, and means which, at the ordinary calculator mode, displays the operator that comes just after the numeric value at the right operator display portion and, at the input history display mode, displays the operator that goes just before the numeric value at the left operator display portion.

9. The electronic calculator of claim 1, further comprising:

means that, at the initialized status after the switching on and after the AC key is depressed, stores the "+" as the first operator of the calculating formula when the numeric key is depressed at first, and when the operator key is depressed at first stores the operator as the first operator of the calculating formula.

* * * * *